United States Patent
Felix

(10) Patent No.: US 11,119,873 B2
(45) Date of Patent: Sep. 14, 2021

(54) PROCESSOR REPAIR

(71) Applicant: Graphcore Limited, Bristol (GB)

(72) Inventor: Stephen Felix, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 157 days.

(21) Appl. No.: 16/395,363

(22) Filed: Apr. 26, 2019

(65) Prior Publication Data

US 2020/0201704 A1    Jun. 25, 2020

(30) Foreign Application Priority Data

Dec. 21, 2018  (GB) ..................... 1821137

(51) Int. Cl.
*G06F 11/20*  (2006.01)

(52) U.S. Cl.
CPC ...... *G06F 11/2043* (2013.01); *G06F 11/2028* (2013.01); *G06F 11/2041* (2013.01)

(58) Field of Classification Search
CPC ............. G06F 11/2043; G06F 11/2028; G06F 11/2041; G06F 11/004; G06F 13/4022;
(Continued)

(56) References Cited

U.S. PATENT DOCUMENTS

2015/0187439 A1  7/2015 Querbach
2019/0303741 A1* 10/2019 Appuswamy .......... G06N 3/049

FOREIGN PATENT DOCUMENTS

GB        2569268 A      6/2019

OTHER PUBLICATIONS

L. Zhang, Y. Han, Q. Xu and X. Li, "Defect Tolerance in Homogeneous Manycore Processors Using Core-Level Redundancy with Unified Topology," 2008 Design, Automation and Test in Europe, Munich, 2008, pp. 891-896, doi: 10.1109/DATE.2008.4484787. (Year: 2008).*

(Continued)

Primary Examiner — Bryce P Bonzo
Assistant Examiner — Albert Li
(74) Attorney, Agent, or Firm — Haynes and Boone, LLP

(57) ABSTRACT

A processor comprises a plurality of processing units, wherein there is a fixed transmission time for transmitting a message from a sending processing unit to a receiving processing unit, based on the physical positions of the sending and receiving processing units in the processor. The processing units are arranged in a column, and the fixed transmission time depends on the position of a processing circuit in the column. An exchange fabric is provided for exchanging messages between sending and receiving processing units, the columns being arranged with respect to the exchange fabric such that the fixed transmission time depends on the distances of the processing circuits with respect to the exchange fabric. The processor comprises at least one delay stage for each processing circuit and switching circuitry for selectively switching the delay stage into or out of a communication path involved in message exchange. For processing circuits up to a defective processing circuit in the column, the delay stage is switched into the communication path, and for processing circuits above the defective processing circuit in the column, including a repairing processing circuit which repairs the defective processing circuit the delay stage is switched out of the communication path whereby the fixed transmission time of processing circuits is preserved in the event of a repair of the column.

35 Claims, 13 Drawing Sheets

(58) Field of Classification Search
CPC .......... G06F 5/06; G06F 5/16; G06F 11/1604;
G06F 11/1658; G06F 11/1675–1687;
H04L 7/0033; H04L 7/0037; H04L
7/0041; H04L 47/32; H04L 47/56
See application file for complete search history.

(56) References Cited

OTHER PUBLICATIONS

K. Goossens, J. Dielissen and A. Radulescu, "AEthereal network on chip: concepts, architectures, and implementations," in IEEE Design & Test of Computers, vol. 22, No. 5, pp. 414-421, Sep.-Oct. 2005, doi: 10.1109/MDT.2005.99. (Year: 2005).*
C. Villalpando, D. Rennels, R. Some and M. Cabanas-Holmen, "Reliable multicore processors for NASA space missions," 2011 Aerospace Conference, Big Sky, MT, 2011, pp. 1-12, doi: 10.1109/AERO.2011.5747447. (Year: 2011).*
Combined Search and Examination Report for GB Patent Application No. GB1821137.5 dated Oct. 9, 2019. 5 pages.

* cited by examiner

PROCESSOR REPAIR

CROSS-REFERENCE TO RELATED APPLICATIONS

This application claims the priority benefit under 35 U.S.C. §119 of United Kingdom Patent Application No. 1821137.5, filed Dec. 21, 2018, the entire contents of which are incorporated herein by reference.

TECHNICAL FIELD

The present disclosure relates to repairing processing units in a processor.

BACKGROUND

In the context of processing data for complex or high volume applications, a work accelerator may be a subsystem to which processing of certain data is offloaded from a host system. Such a work accelerator may have a specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a work accelerator specialised for machine intelligence applications may comprise a large degree of multi-threading. One form of parallelism can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables data to be exchanged between them. Such an accelerator may function as a subsystem for a host system to perform parallel processing of data sets provided to it.

In general, there may exist dependencies between the portions of a program running on different tiles. A technique is, therefore required to prevent a piece of code on one tile running ahead of data upon which it is dependent being made available by another piece of code on another tile. There are a number of possible schemes for achieving this, one of which is described here by way of example, 'BSP', bulk synchronous protocol. According to BSP, each tile performs a compute phase and an exchange phase in an alternating cycle. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet proceed to the next compute phase. Furthermore, according to the BSP principle, a barrier synchronization is placed at the juncture transitioning from the compute phase into the exchange phase, or transitioning from the exchange phase into the compute phase, or both. That is to say, either: (a) all tiles are required to complete their respective compute phases before any in the group is allowed to proceed to the next (exchange) phase, or (b) all tiles in the group are required to complete their respective exchange phases before any tile in the group is allowed to proceed to the next (compute) phase, or (c) both. In some scenarios, a tile performing computation may be allowed to communicate with other system resources such as a network card or storage disk, as long as no communication with other tiles in the group is involved.

Some single chip processors may have in excess of a thousand tiles on the chip, with individual transistors packed at a very high density. When manufacturing chips on semiconductor substrates, manufacturing errors are expected at a certain level, and these might affect functionality of one or more tiles on the chip. Unless there is a repair mechanism to repair the chip in this case, it must be discarded. The percentage of properly functioning discarded chips in a batch is referred to as the "yield".

SUMMARY OF THE INVENTION

According to one aspect of the invention, there is provided a processor comprising a plurality of processing units, wherein there is a fixed transmission time for transmitting a message from a sending processing unit to a receiving processing unit, based on the physical positions of the sending and receiving processing units in the processor, wherein a plurality of processing units are arranged in a column, wherein the fixed transmission time depends on the position of a processing circuit in the column, the processor comprising an exchange fabric for exchanging messages between sending and receiving processing units, the column being arranged with respect to the exchange fabric such that the fixed transmission time depends on the distances of the processing circuits with respect to the exchange fabric, wherein each processing circuit comprises at least one communication path involved in a message exchange, and wherein the processor comprises at least one delay stage for each processing circuit and switching circuitry for selectively switching the delay stage into or out of the communication path, the arrangement being such that for processing circuits up to a defective processing circuit in the column, the delay stage is switched into the communication path, and for processing circuits above the defective processing circuit in the column, including a repairing processing circuit which repairs the defective processing circuit the delay stage is switched out of the communication path whereby the fixed transmission time of processing circuits is preserved in the event of a repair of the column.

Each processing circuit may have a physical identity based on its position in the column, and a logical identity for the purposes of accepting code to be executed by the processing unit, wherein the physical identity and the logical identity are the same for all processing circuits up to the defective processing circuit, but wherein in the case of a repair each processing circuit above the defective processing circuit takes on a logical identity to match the physical identity of the processing circuit which it replaces.

A repairing processing circuit may take on the logical identity of the processing circuit adjacent to it in the column.

Each processing unit above the repairing processing unit may take on a logical identity representing the physical identity of the processing circuit below in the column.

Preferably, the latency of the delay stage matches the latency of the communication path to transverse a processing circuit.

In one pathway, a processor according to any preceding claim wherein the communication path comprises a data output wire which transmits data from a processing circuit to the exchange fabric.

In another pathway, the communication path comprises a switching control wire which controls a switching circuit to accept input data from the exchange fabric.

In another pathway, the communication path comprises a data input wire which is connected to the output of the switching circuit to supply data to the processing circuit.

In another pathway, the communication path comprises a wire for receiving a synchronisation acknowledgement signal from synchronisation logic on the processor, wherein the synchronisation logic on the processor is operable to generate a synchronisation acknowledgement signal to each processing circuit when it has received a request for synchronisation from each of the processing circuits.

The processor may comprise a plurality of columns, each column having the same number of processing circuits and wherein a processing circuit in an nth position in each column has the same latency with respect to the exchange fabric as a processing circuit in an nth position of each other column.

The exchange fabric may comprise multiple groups of pipelined exchange paths, wherein the processing circuits in each column have data output connection wires connected to exchange paths in a respective group associated with that column.

The processor may have associated with each column a group of switching circuits, each switching circuit having multiple inputs connected to exchange paths in each of the groups of the exchange fabric.

The switching circuits may be associated with decode logic configured to receive a switching control signal on the control input, the control signal comprising a column identifier and a sub-identifier and to select one of the switching circuits based on the column identifier and one of the inputs based on the sub-identifier.

The processor may have means for recording a repair code for each column which has a defective processing circuit.

The switching circuit may be associated with repair logic which is operable to compare the sub-identifier with the repair code, and if the sub-identifier is less than the repair code, select one of the inputs, but if the repair code equals or is greater than the sub-identifier to increment the sub-identifier and select the one of the inputs corresponding to the incremented sub-identifier.

The processing circuit can comprise multiple processing tiles, each associated with a respective switching circuit.

The switching circuits associated with each delay stage in a column may be controllable by the repair code for that column.

DETAILED DESCRIPTION

The present disclosure concerns a repair mechanism for a multitile processor chip when one or more of the tiles are damaged/non functional. The following description explains various embodiments of the application in further detail. This application relates to a processor comprising a plurality of processor tiles. The data processing system may be a so called intelligence processing unit (IPU) or any class of accelerator (XPU). The techniques described herein can be used with the IPUs described in our earlier U.S. application Ser. No. 15/885925, the contents of which are herein incorporated by reference. As will become evident, the techniques described herein are applicable to an architecture wherein message exchange between tiles depends on known message delivering latency between particular tiles. Such an architecture is described herein before explaining the repair mechanism.

Figure 1:
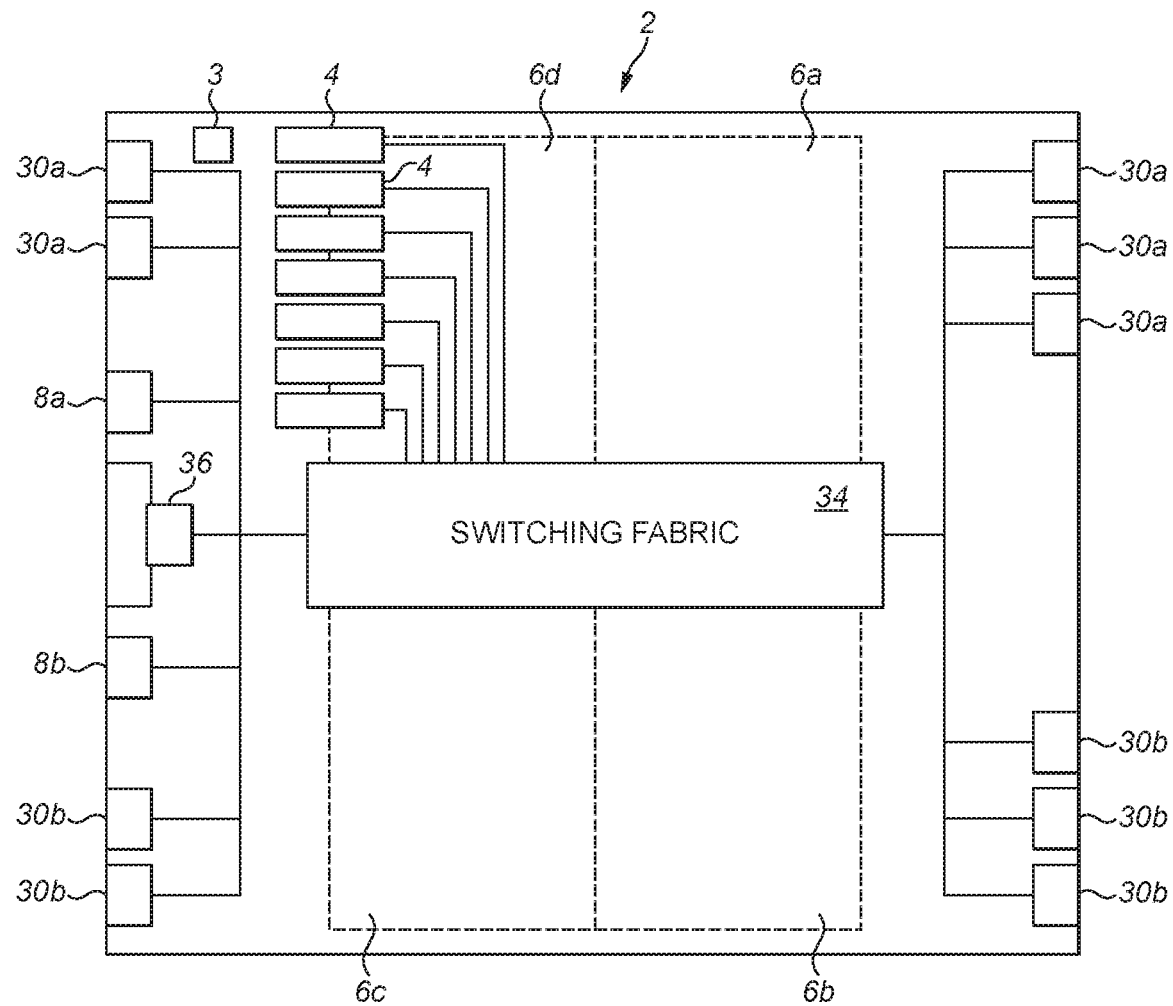
FIG. 1 is a schematic view of a multi-tile processor.

FIG. 1 illustrates schematically the architecture of a single chip processor 2. The processor is referred to herein as an IPU (Intelligence Processing Unit) to denote its adaptivity to machine intelligence applications. In a computer, the single chip processors can be connected together as discussed later, using links on the chip, to form a computer. The present description focuses on the architecture of the single chip processor 2. The processor 2 comprises multiple processing units referred to as tiles. In one embodiment, there are 1216 tiles organised in arrays 6a, 6b, 6c, and 6d. The processor can be considered as having East and West regions, and North and South regions. 6a may be referred to as "North East array", 6b may be referred to as "South East array", 6c may be referred to as "South West array", and 6d may be referred to as "North West array" In the described example, each array has four columns of 76 tiles (in fact there are 80 tiles in a manufactured chip, for redundancy purposes, i.e. to implement a repair as discussed later). It will be appreciated that the concepts described herein extend to a number of different physical architectures—one example is given here to aid understanding. The chip 2 has two chip-to-host links 8a, 8b and 4 chip-to-chip links 30a, 30b arranged on the "West" edge of the chip 2. The chip 2 receives work from a host (not shown) which is connected to the chip via one of the card-to-host links in the form of input data to be processed by the chip 2. The chips can be connected together into cards by a further 6 chip-to-chip links 30a, 30b arranged along the "East" side of the chip. A host may access a computer which is architected as a single chip processor 2 as described herein or a group of multiple interconnected single chip processors 2 depending on the workload from the host application.

The chip 2 has a clock generator 3 which generates a clock signal from an on or off chip clock to control the timing of chip activity. The clock generator is connected to all of the chip's circuits and components. The chip 2 comprises a time deterministic switching fabric 34 to which all tiles and links are connected by sets of connection wires, the switching fabric being stateless, i.e. having no program visible state and therefore not requiring memory. Each set of connection wires is fixed end to end. The wires are pipelined. In this embodiment, a set comprises 32 data wires plus control wires, e.g. a valid bit. Each set can carry a 32-bit data packet, but note herein that the word "packet" denotes a set of bits representing a datum (sometimes referred to herein as a data item), perhaps with one or more valid bit. The "packets" do not have headers with destination identifiers which permit an intended recipient to be uniquely identified, nor do they have end-of-packet information. Instead, they each represent a numerical or logical value input to or output from a tile. The packets may include headers indicating at least one direction of travel through the switching fabric 34, however. Each tile has its own local memory (described later). The tiles do not share memory. The switching fabric constitutes a cross set of connection wires only connected to multiplexers and tiles as described later. Data exchange between tiles is conducted on a time deterministic basis as described herein. A pipelined connection wire comprises a series of temporary stores, e.g. latches or flip-flops which hold datum for a clock cycle before releasing it to the next store. Time of travel time the wire is determined by these temporary stores, each one using up a clock cycle of time in a path between any two points.

Figure 2:
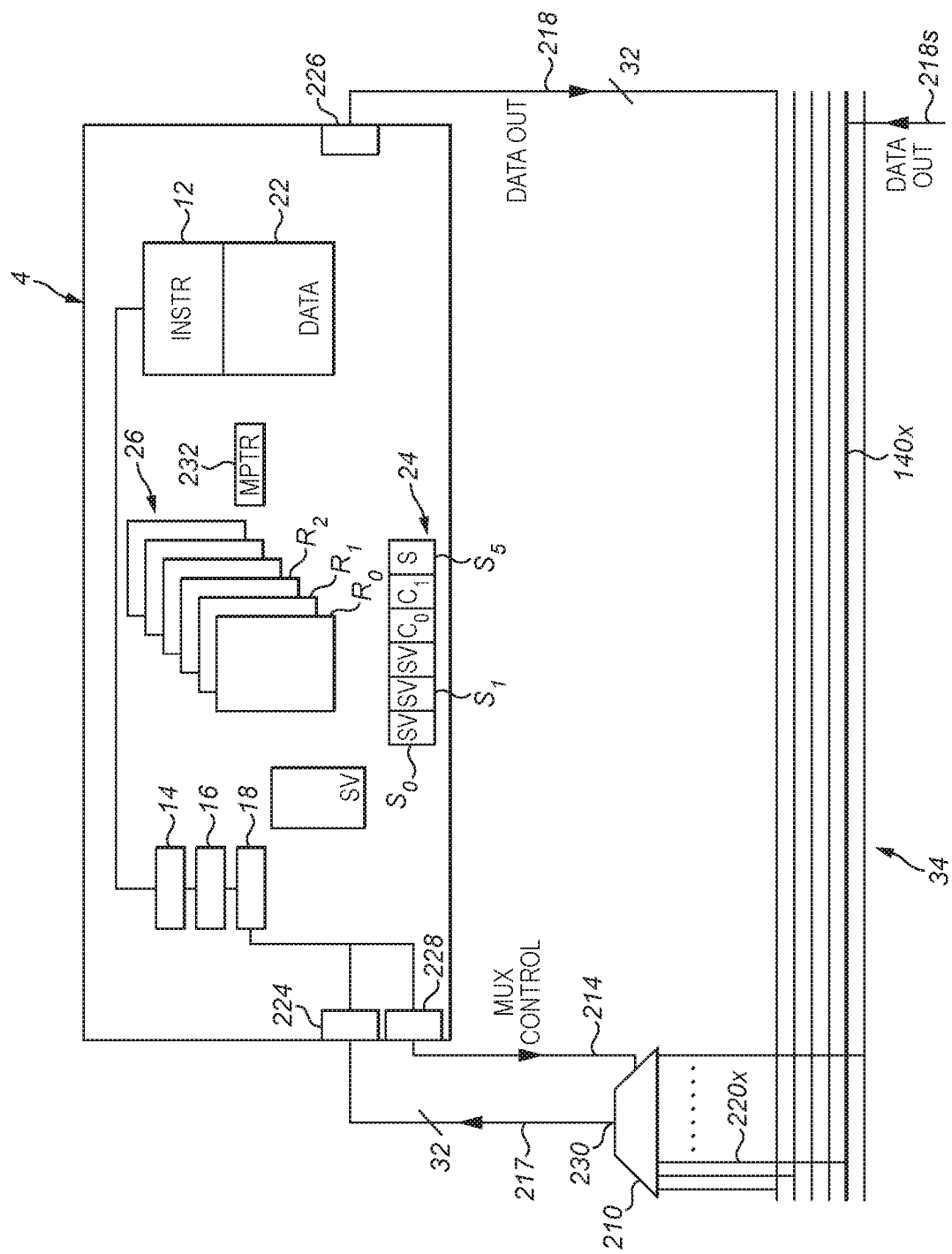
FIG. 2 is a schematic view of a single tile illustrating the input and output signals.

FIG. 2 illustrates an example tile 4 in accordance with embodiments of the present disclosure. In the tile, multiple threads are interleaved through a single execution pipeline. The tile 4 comprises: a plurality of contexts 26 each arranged to represent the state of a different respective one of a plurality of threads; a shared instruction memory 12 common to the plurality of threads; a shared data memory 22 that is also common to the plurality of threads; a shared execution pipeline 14, 16, 18 that is again common to the plurality of threads; and a thread scheduler 24 for scheduling the plurality of threads for execution through the shared pipeline in an interleaved manner. The thread scheduler 24 is schematically represented in the diagram by sequence of time slots So Ss, but in practice is a hardware mechanism managing program counters of the threads in relation to their time slots. The execution pipeline comprises a fetch stage 14, a decode stage 16, and an execution stage 18 comprising an execution unit (EXU) and a load/store unit (LSU). Each of the contexts 26 comprises a respective set of registers $R_0$, $R_1$ . . . for representing the program state of the respective thread.

The fetch stage 14 is connected to fetch instructions to be executed from the instruction memory 12, under control of the thread scheduler 24. The thread scheduler 24 is configured to control the fetch stage 14 to fetch instructions from the local program for execution in each time slot. The individual operation of each tile is not important in the context of repair, but the way in which they exchange data is.

Note that in normal operation the program loaded into each tile is determined by a processor or compiler to allocate work based on the graph of the machine intelligence model being supported. This graph defines what code is executed on each tile and data is exchanged between tiles.

One of the contexts 26, labelled SV, is reserved for a special function, to represent the state of a "supervisor" (SV) whose job it is to coordinate the execution of "worker" threads. The supervisor can be implemented as a program organised as one or more supervisor threads which may run concurrently. The supervisor thread may also be responsible for performing barrier synchronisations described later or may be responsible for exchanging data on and off the tile, as well as in and out of local memory so that is can be shared between the worker threads between computations.

Each worker thread is a codelet intended to represent a vertex in the graph and to execute atomically. That is all the data it consumes is available at launch and all the data it produces is not visible to other threads until it exits. It runs to completion (excepting error conditions).

Each of the worker threads is allowed a respective time slot $C_0$, $C_1$ to perform its one or more computation tasks. At the end of its task(s), the worker thread then hands the time slot in which it is running back to the supervisor thread SV by executing an EXIT instruction.

The EXIT instruction acts on the thread scheduler 24 so that the time slot in which it is executed is returned back to the supervisor thread. The supervisor thread can then perform one or more supervisor subsequent tasks (e.g. barrier synchronization and/or exchange of data), and/or continue to execute another relinquish instruction, and so forth.

Figure 3:
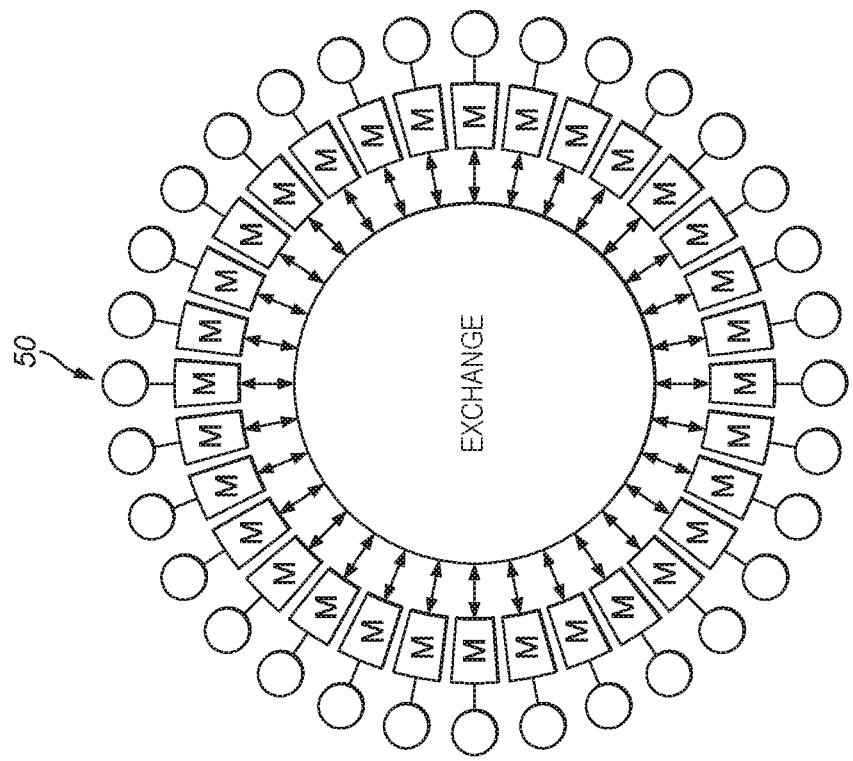
FIG. 3 is a schematic diagram illustrating operation in a bulk synchronous protocol.
Figure 3:
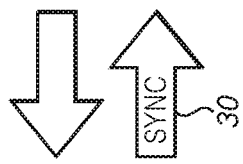
Figure 3:
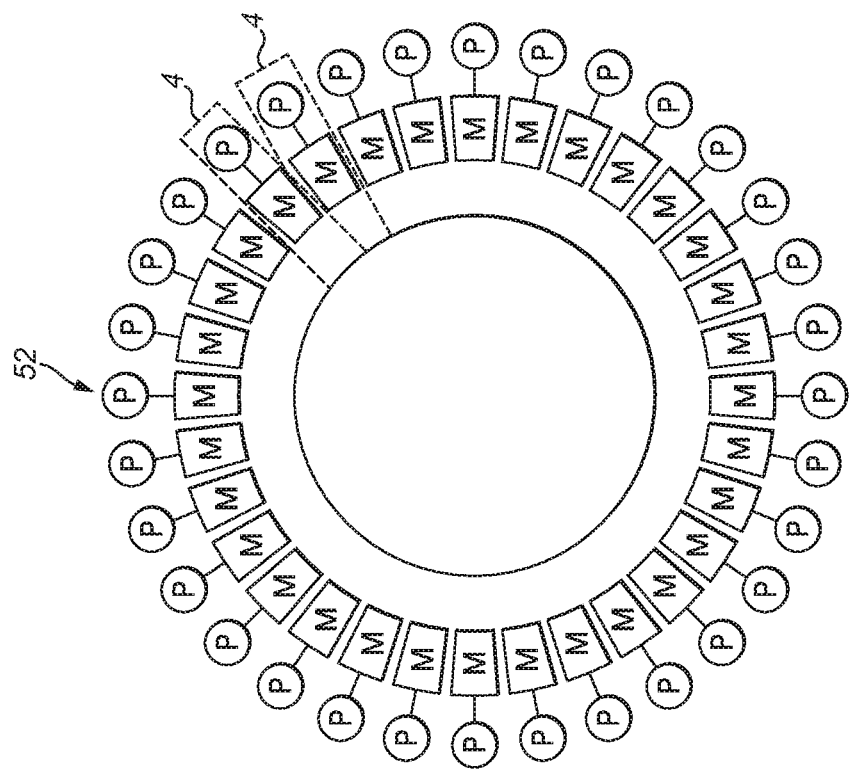

As briefly mentioned above, data is exchanged between tiles in the chip. Each chip operates a Bulk Synchronous Parallel protocol, comprising a compute phase and an exchange phase. The protocol is illustrated for example in FIG. 3. The left-hand diagram in FIG. 3 represents a compute phase in which each tile 4 is in a phase where the stateful codelets execute on local memory 12, 22. Although in FIG. 3 the tiles 4 are shown arranged in a circle this is for explanatory purposes only and does not reflect the actual architecture.

BSP in itself is known in the art. According to BSP, each tile 4 performs a compute phase 52 and an exchange (sometimes called communication or message-passing) phase 50 in an alternating cycle. The compute phase and exchange phase are performed by the tile executing instructions. During the compute phase 52 each tile 4 performs one or more computation tasks locally on-tile, but does not communicate any results of these computations with any others of the tiles 4. In the exchange phase 50 each tile 4 is allowed to exchange (communicate) one or more results of the computations from the preceding compute phase to and/or from one or more others of the tiles in the group, but does not yet perform any new computations that have a potential dependency on a task performed on another tile 4 or upon which a task on another tile 4 might potentially have a dependency (it is not excluded that other operations such as internal control-related operations may be performed in the exchange phase). Further, according to the BSP principle, a barrier synchronization is placed at the juncture transitioning from the compute phases 52 into the exchange phase 50, or the juncture transitioning from the exchange phases 50 into the compute phase 52, or both. That is it say, either: (a) all tiles 4 are required to complete their respective compute phase 52 before any in the group is allowed to proceed to the next exchange phase 50, or (b) all tiles 4 in the group are required to complete their respective exchange phase 50 before any tile in the group is allowed to proceed to the next compute phase 52, or (c) both of these conditions is enforced. This sequence of exchange and compute phases may then repeat multiple times. In BSP terminology, each repetition of exchange phase and compute phase is referred to herein as a "superstep", consistent with usage in some prior descriptions of BSP. It is noted herein that the term "superstep" is sometimes used in the art to denote each of the exchange phase and compute phase.

Each tile indicates its synchronisation state to a sync module 36. Once it has been established that each tile is ready to send data, the synchronisation process 30 causes the system to enter an exchange phase which is shown on the right-hand side of FIG. 3. In this exchange phase, data values move between tiles (in fact between the memories of tiles in a memory-to-memory data movement). In the exchange phase, there are no computations which might induce concurrency hazards between tile programs. In the exchange phase, each datum moves along the connection wires on which it exits a tile from a transmitting tile to one or multiple recipient tile(s). At each clock cycle, datum moves a certain distance along its path (store to store), in a pipelined fashion. When a datum is issued from a tile, it is not issued with a header identifying a recipient tile (although the datum may include a header indicating at least one direction of travel through the switching fabric 34). Instead, the recipient tile knows that it will be expecting a datum from a certain transmitting tile at a certain time. Thus, the computer described herein is time deterministic. Each tile operates a program which has been allocated to it by the programmer or by a compiler function, where the programmer or the compiler function has knowledge of what will be transmitted by a particular tile at a certain time and what needs to be received by a recipient tile at a certain time. In order to achieve this, SEND instructions are included in the local programs executed by the processor on each tile, where the time of execution of the SEND instruction is predetermined relative to the timing of other instructions being executed on other tiles in the computer. This is described in more detail later, but firstly the mechanism by which a recipient tile can receive a datum at a predetermined time will be described. Each tile 4 is associated with its own multiplexer 210: thus, the chip has 1216 multiplexers. Each tile is connected to its associated multiplexer 210 via an input wire 217 over which it is configured to receive a datum. Each multiplexer has 1216 inputs, each input being 32-bits wide (plus optionally some control bits). Each input is connected to a respective set of connecting wires $140_{x\,in}$ the switching fabric 34. The connecting wires of the switching fabric are also connected to a data out set of connection wires 218 from each tile (a broadcast exchange bus, described later), thus there are 1216 sets of connecting wires which in this embodiment extend in a direction across the chip. For ease of illustration, a single emboldened set of wires $140_x$ is shown connected to the data out wires $218_s$, coming from a tile not shown in FIG. 2, in the south array 6b. This set of wires is labelled $140_x$ to indicate that it is one of a number of sets of crosswires $1400_0$-$140_{1215}$. As can now be seen from FIG. 2, it will be appreciated that when the multiplexer 210 is switched to the input labelled $220_x$ then that will connect to the crosswires $140_x$ and thus to the data out wires $218_s$ of the tile (not shown in FIG. 2) from the south array 6b. If the multiplexer is controlled to switch to that input ($220_{sc}$) at a certain time, then the datum received on the data out wires which is connected to the set of connecting wire $140_x$ will appear at the output 230 of the multiplexer 210 at a certain time. It will arrive at the tile 4 a certain delay after that, the delay depending on the distance of the multiplexer from the tile. As the multiplexers form part of switching fabric, the delay from the tile to the multiplexer can vary depending on the location of the tile. To implement the switching, the local programs executed on the tiles include switch control instructions (PUTi) which cause a multiplexer control signal 214 to be issued to control the multiplexer associated with that tile to switch its input at a certain time ahead of the time at which a particular datum is expected to be received at the tile. In the exchange phase, multiplexers are switched and packets (data) are exchanged between tiles using the switching fabric. It is clear from this explanation that the switching fabric has no state—the movement of each datum is predetermined by the particular set of wires to which the input of each multiplexer is switched.

The connection structure of the tile will now be described in more detail.

Each tile has three interfaces:
 an exin interface 224 which passes data from the switching fabric 34 to the tile 4;
 an exout interface 226 which passes data from the tile to the switching fabric over the broadcast exchange bus 218; and
 an exmux interface 228 which passes the control mux signal 214 (mux-select) from the tile 4 to its multiplexer 210.

Figure 4:
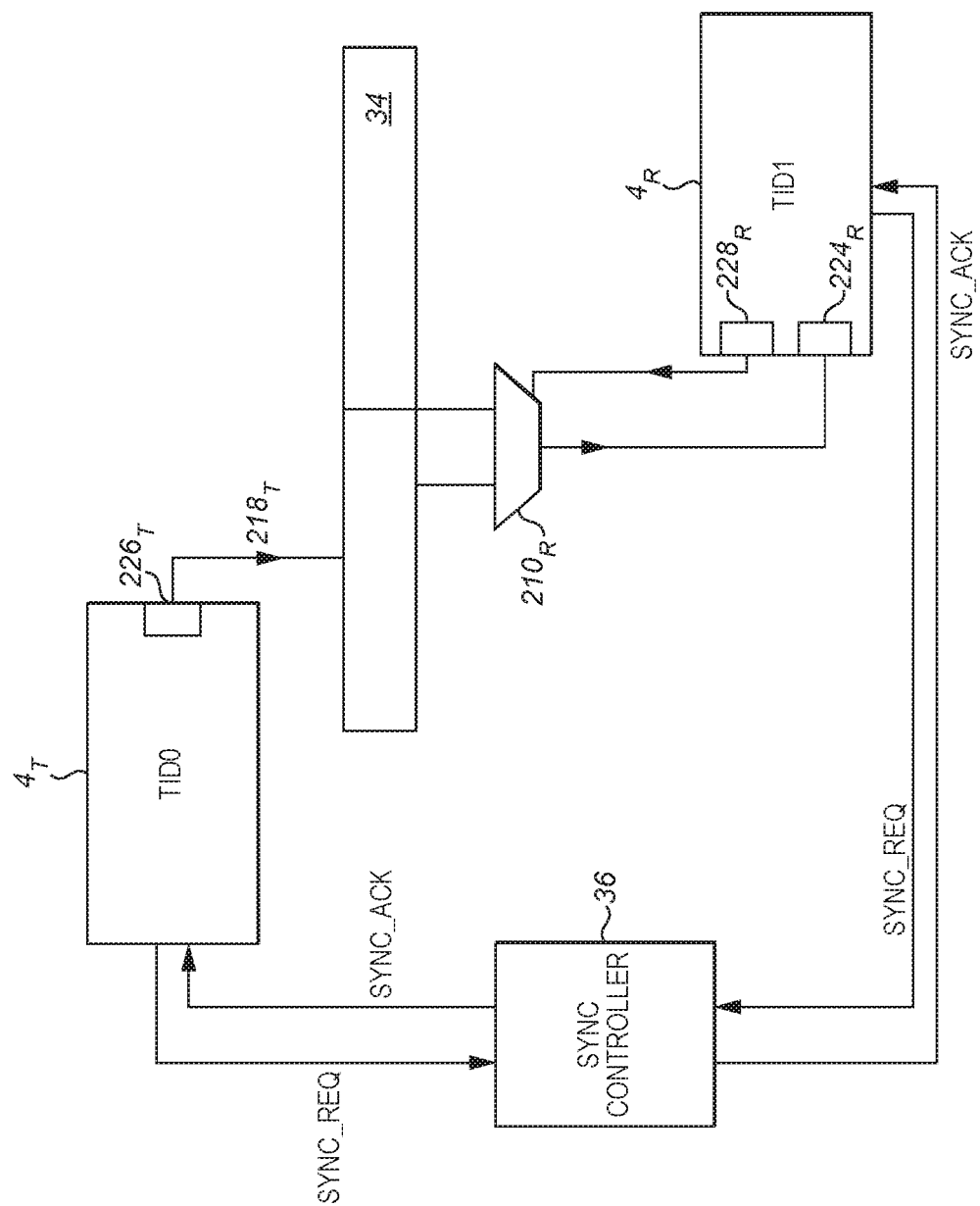
FIG. 4 is a schematic diagram illustrating Time Deterministic Exchange in a BSP processor.

In order to ensure each individual tile executes SEND instructions and switch control instructions at appropriate times to transmit and receive the correct data, exchange scheduling requirements need to be met by the programmer or compiler that allocates individual programs to the individual tiles in the computer. This function is carried out by an exchange scheduler which needs to be aware of the following exchange timing (BNET) parameters. In order to understand the parameters, a simplified version of FIG. 2 is shown in FIG. 4. FIG. 4 also shows a recipient tile as well as a transmitting tile.

I. The relative SYNC acknowledgement delay of each tile, BNET_RSAK (TID). TID is the tile identifier held in a TILE_ID register described later. This is a number of cycles always greater than or equal to 0 indicating when each tile receives the ack signal from the sync controller 36 relative to the earliest receiving tile. This can be calculated from the tile ID, noting that the tile ID indicates the particular location on the chip of that tile, and therefore reflects the physical distances. FIG. 4 shows one transmitting tile $4_T$, and one recipient tile $4_R$. Although shown only schematically and not to scale, the tile $4_T$ is indicated closer to the sync controller and the tile $4_R$ is indicated being further away, with the consequence that the sync acknowledgement delay will be shorter to the tile $4_T$ than for the tile $4_R$. A particular value will be associated with each tile for the sync acknowledgement delay. These values can be held for example in a delay table, or can be calculated on the fly each time based on the tile ID.
 II. The exchange mux control loop delay, BNET_MXP (TID of receiving tile). This is the number of cycles between issuing an instruction (PUTi-MUXptr) that changes a tile's input mux selection and the earliest point at which the same tile could issue a (hypothetical) load instruction for exchange data stored in memory as a result of the new mux selection. Looking at FIG. 4, this delay comprises the delay of the control signal getting from the exmux interface $228_R$ of recipients tile $4_R$ to its multiplexer $210_R$ and the length of the line from the output of the multiplexer to the data input exin interface 224.

III. The tile to tile exchange delay, BNET_TT (TID of sending tile, TID of receiving tile). This is the number of cycles between a SEND instruction being issued on one tile and the earliest point at which the receiving tile could issue a (hypothetical) load instruction pointing to the sent value in its own memory. This has been determined from the tile IDs of the sending and receiving tiles, either by accessing a table such as has already been discussed, or by calculation.. Looking again at FIG. 4, this delay comprises the time taken for data to travel from transmit tile $4_T$ from its ex_out interface $226_T$ to the switching fabric 14 along its exchange bus $218_T$ and then via the input mux 2108 at the receiving tile $4_R$ to the ex_in interface $224_R$ of the receiving tile.

IV. The exchange traffic memory pointer update delay, BNET_MMP( ). This is the number of cycles between issuing an instruction (PUTi-MEMptr) that changes a tile's exchange input traffic memory pointer and the earliest point at which that same tile could issue a (hypothetical) load instruction for exchange data stored in memory as a result of the new pointer. This is a small, fixed number of cycles. The memory pointer has not yet been discussed, but is shown in FIG. 2 referenced 232. It acts as a pointer into the data memory 202 and indicates where incoming data from the ex_in interface 224 is to be stored. This is described in more detail later.

Figure 5:
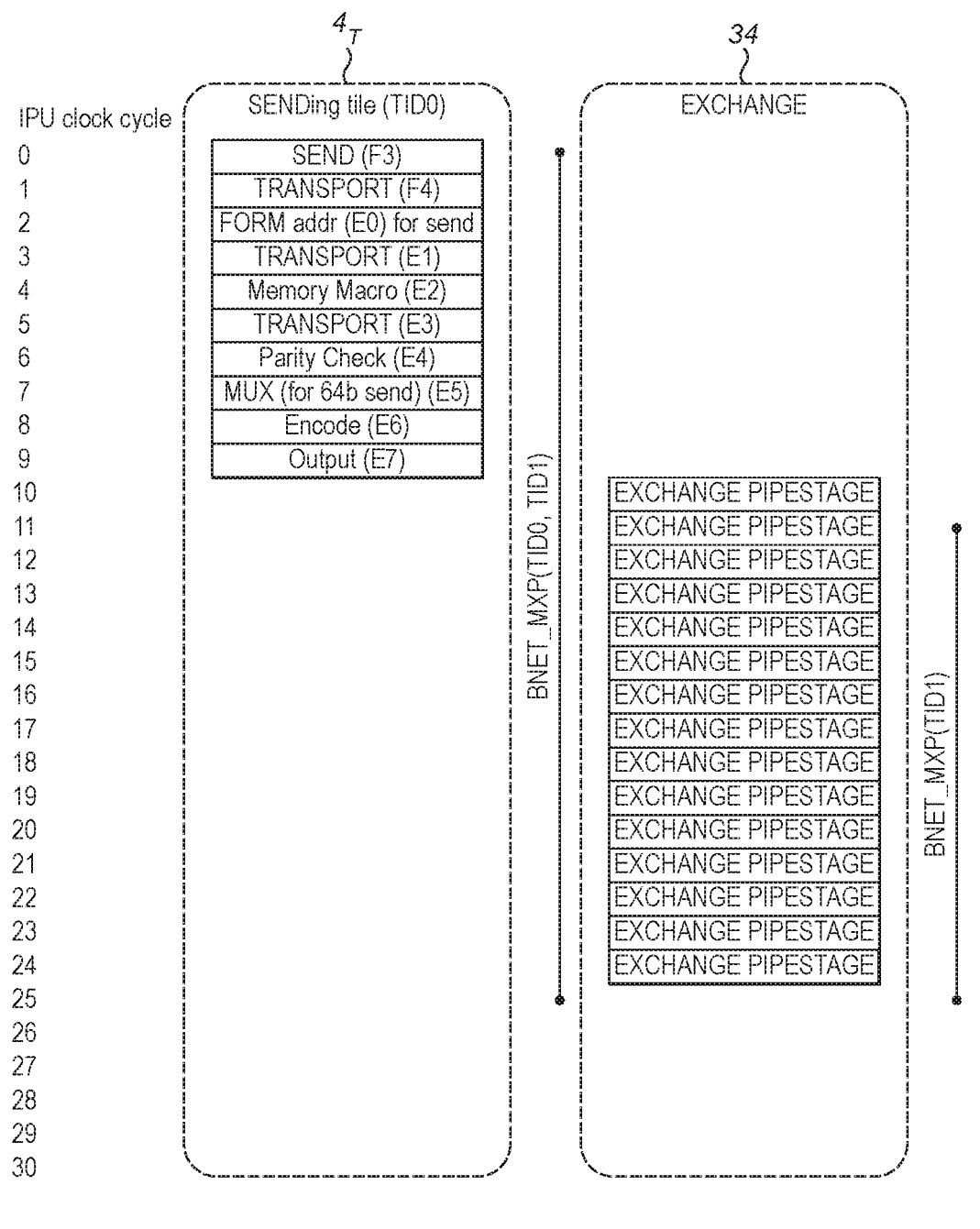
FIG. 5 is a schematic diagram illustrating relative timings in a sending tile, the exchange fabric and the receiving tile.
Figure 5:
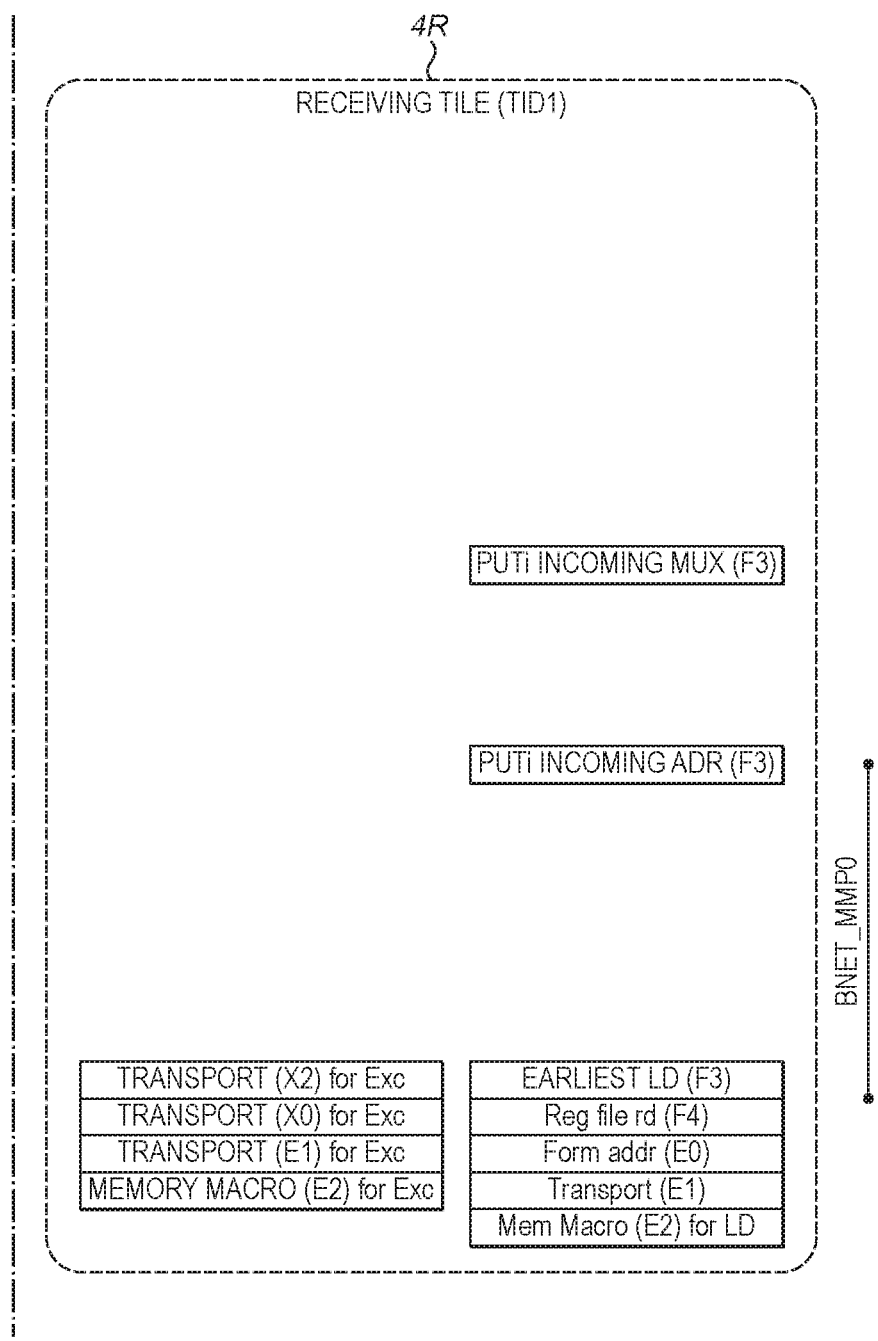

FIG. 5 shows the exchange timings in more depth. On the left-hand side of FIG. 4 is the IPU clock cycles running from 0-30. Action on the sending tile $4_T$ occurs between IPU clock cycles 0 and 9, starting with issuance of a send instruction (SEND $F_3$). In IPU clock cycles 10 through 24, the datum pipelines its way through the switching fabric 34.

Looking at the receiving tile $4_R$ in IPU clock cycle 11 a PUTi instruction is executed that changes the tile input mux selection: PUTi-MXptr ($F_3$).

In cycle 23, the memory pointer instruction is executed, PUTi-MEMptr ($F_3$), allowing for a load instruction in ITU clock cycle 25.

On the sending tile $4_T$, IPU clock cycles 1, 3 and 5 are marked "Transport ( )". This is an internal tile delay between the issuance of a SEND instruction and the manifestation of the data of the SEND instruction on the exout interface. F4, E1, E3 etc. denote datum from earlier SEND instructions in transport to the exout interface. IPU clock cycle 2 is allocated to form an address EO for a SEND instruction. Note this is where EO is to be fetched from, not its destination address. In IPU clock cycle 4 a memory macro is executed to fetch E2 from memory. In IPU clock cycle 6 a parity check is performed on E4. In IPU clock cycle 7 a MUX output instruction is executed to send E5. In IPU clock cycle 8 E6 is encoded and in IPU clock cycle E7 is output.

In the exchange fabric 34, IPU clock cycles 8 through 24 are labelled "exchange pipe stage". In each cycle, a datum moves "one step" along the pipeline (between temporary stores such as flip flops or latches).

Cycles 25-28 denote the delay on the recipient tile $4_R$ between receiving a datum at the exin interface (see Mem Macro (E2) for Exc), while cycles 25-29 denote the delay between receiving a datum at the exin interface and loading it into memory (see Mem Macro (E2)) for LD. Other functions can be carried out in that delay—see Earliest LD (F3), Reg file rd (F4), form adds (E0), Transport (E1).

In simple terms, if the processor of the receiving tile $4_R$ wants to act on a datum (e.g. F3) which was the output of a process on the transmitting tile $4_T$, then the transmitting tile $4_T$ has to execute a SEND instruction [SEND (F3] at a certain time (e.g. IPU clock cycle 0 in FIG. 5), and the receiving tile has to execute a switch control instruction PUTi EXCH MXptr (as in IPU clock cycle 11) by a certain time relative to the execution of the SEND instruction [SEND (F3)] on the transmitting tile. This will ensure that the data arrives at the recipient tile in time to be loaded [earliest LD (F3)] in IPU cycle 25 for use in a codelet being executed at the recipient tile.

Note that the receive process at a recipient tile does not need to involve setting the memory pointer as with instruction PUTi MEMptr. Instead, the memory pointer 232 (FIG. 2) automatically increments after each datum is received at the exin interface 224. Received data is then just loaded into the next available memory location. However, the ability to change the memory pointer enables the recipient tile to alter the memory location at which the datum is written. All of this can be determined by the compiler or programmer who writes the individual programs to the individual tiles such that they properly communicate. This results in the timing of an internal exchange (the inter exchange on chip) to be completely time deterministic. This time determinism can be used by the exchange scheduler to highly optimise exchange sequences.

As explained earlier with reference to FIG. 1, a large number of tiles are present on each processing chip. In one embodiment, there are 1216 tiles on a single chip. Since there is interdependency between the tiles, i.e. the processing performed on one tile is dependent on the results of processing on another tile, which is determined by the compiler, it is important that each tile on the processing chip be tested in order to determine whether each tile is fully functional. If there is a fault with a tile, that tile cannot be allocated any code for execution. It is not at all straightforward to advise the compiler, for each chip, which tiles are faulty. Even if it was possible to advise a compiler, for each chip, which tiles on that chip are faulty this is not an efficient way of generating code for the chips. In the first place, each piece of code would have to be compiled individually for each particular chip. This is not appropriate when attempting to compile code for large numbers of chips which may be working in association or in parallel. What is desired is code-generated by the compiler which can be loaded into any chip having a certain predefined architecture, regardless of which tile(s) on that chip might be faulty. The second difficulty that arises is that if the compiler has to take into account that code cannot be executed on faulty tiles, it also needs to take into account all of the message exchange that might have involved that tile. When compiling code for large machine learning graphs onto chips with huge number of tiles, as in the present case, this is very inefficient and impractical. The techniques described herein overcome these difficulties by enabling the repair of the chip to accommodate faulty tiles to be agnostic to the compiler. All the compiler needs to know is the chip architecture, and it can assume that any chip has been repaired in conformance with the same chip architecture, using the technique described herein.

Figure 6:
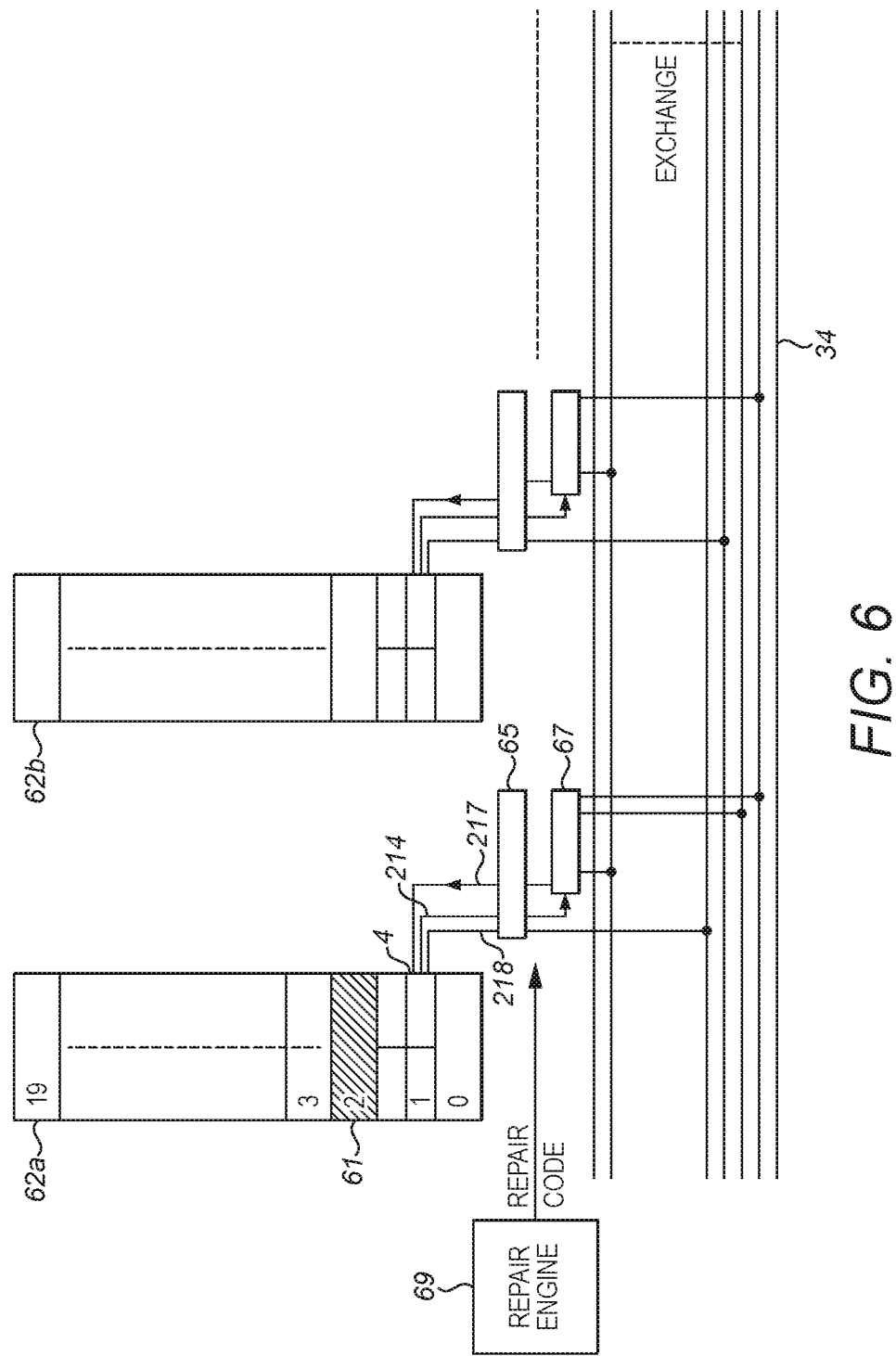
FIG. 6 is a schematic diagram of part of multi-tile processor.

Reference is made to FIG. 6, which illustrates an example of the processing chip 2, illustrating the arrangement of tiles 4 on the chip in more detail. Each tile 4 is part of a set of 4 tiles, referred to as a supertile 61. Each supertile 61 comprises four tiles 4. For simplicity, only a few of the supertiles 61 shown in FIG. 6 are shown divided into their constituent tiles.

Each supertile 61 is part of a subsystem of tiles referred to as a column 62. Therefore, each tile 4 is also part of a column 62. Although, in FIG. 6, each column 62 is shown as having only six supertiles 61. In one embodiment, each column 62 comprises twenty supertiles 61 (80 tiles in total).

As described above, each tile 4 has a 32 bit input connection 217, and 32 bit output connection 218. As noted, the tile 4 knows (because it is defined in the sequence of instructions compiled for the tile) that it will be expecting a datum from a certain transmitting tile at a certain time, and executes a PUTi-MUXptr instruction, to control the multiplexer to switch at a certain time to the input connected to the set of connecting wire 140 which is connected to the output 218 of the sending tile. This ensures that the datum will appear at the output 230 of the multiplexer 210 at the time that the receiving tile is expecting to receive it.

As noted, it is necessary to perform testing of all of the tiles 4 on the chip 2 so as to repair any faults that are detected. This testing comprises running a Built In Self-Test (BIST) mechanism for all of the memory in the chip 2. In response to determining that any of the tiles' memories are determined to be faulty and unrepairable, an indication of this is stored. The indication is provided to a fault detection system, which may be external to the chip 2, or part of the chip 2. Additionally, the testing comprises running a scan test for all of the logic of the tiles 4 on the chip 2 so as to detect any faults. In response to determining that any of the tiles's logic is faulty, an indication of this is stored. Therefore, an indication that one or more faults have occurred for a tile are stored in the repair engine 69. Note that it may be necessary to run only one test—as soon as a tile is detected as having a fault, it cannot be used.

One response to detecting an unrepairable fault in a tile, would be to dispose of the entire processing chip 2. In this way, it is ensured that any processing chips which are not disposed of are free from faults, and each tile 4 will be able to receive, from other tiles, the required data to process according to the compiled instructions since each tile in the chip is fully functional. However, disposing of a full processing chip involves unacceptably low yields. Therefore, embodiments of the application provide, a plurality of redundant tiles, and a repair mechanism to activate them in response to detection of a fault in one or more tile on the chip.

As mentioned, each column 62a, 62b . . . n of the processing chip 2 comprises a number of tiles 4 arranged in supertiles 61. According to embodiments of the application, each column 4 comprises a redundant supertile 61 (labelled ST19 in FIG. 6) located at the remotest end of the column from the exchange that may be inactive in any columns that have no faulty tiles. In some other embodiments, where a column has no faulty tiles, the supertiles may be retained with respective tile identities and used to create a functioning chip with a larger number of tiles. In practice, this would only be feasible in situations where the die required no repair such that all 1280 tiles could be exposed for use. In response to the detection of a fault in a supertile in a column, the redundant supertile 61 is utilised to render the column functional (76 tiles, 19 supertiles). To achieve this, each supertile "above" the faulty file acquires the tile identity of its lower adjacent tile and is loaded with the pre-compiled instructions to be executed by the tile having that tile identity.

Figures 7, 8:
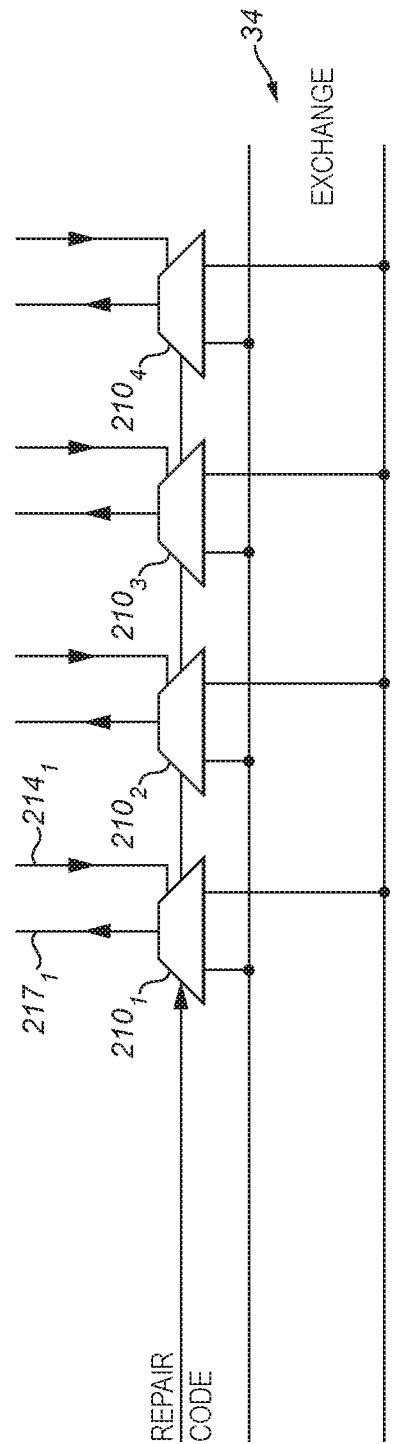
FIG. 7 illustrates the bit sequence of a tile identifier.
FIG. 8 is a schematic diagram illustrating multiplexor repair.
Figure 10A:
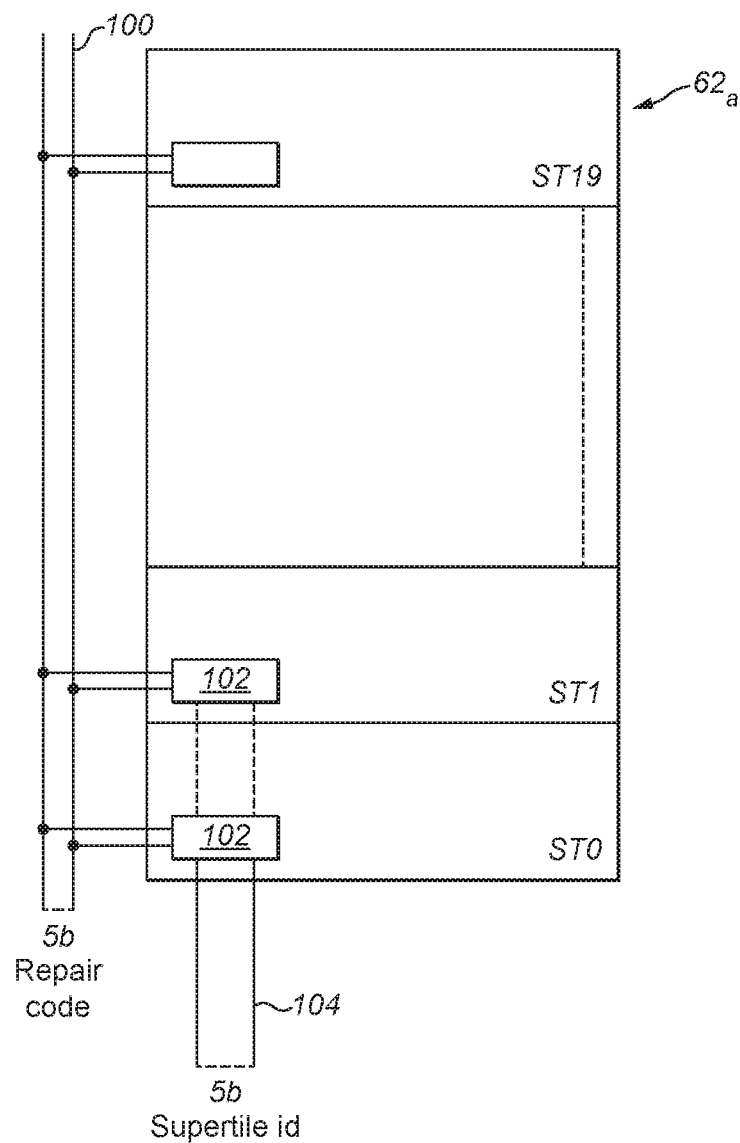
FIG. 10A is a schematic diagram of one column illustrating tile numbering.
Figure 10B:
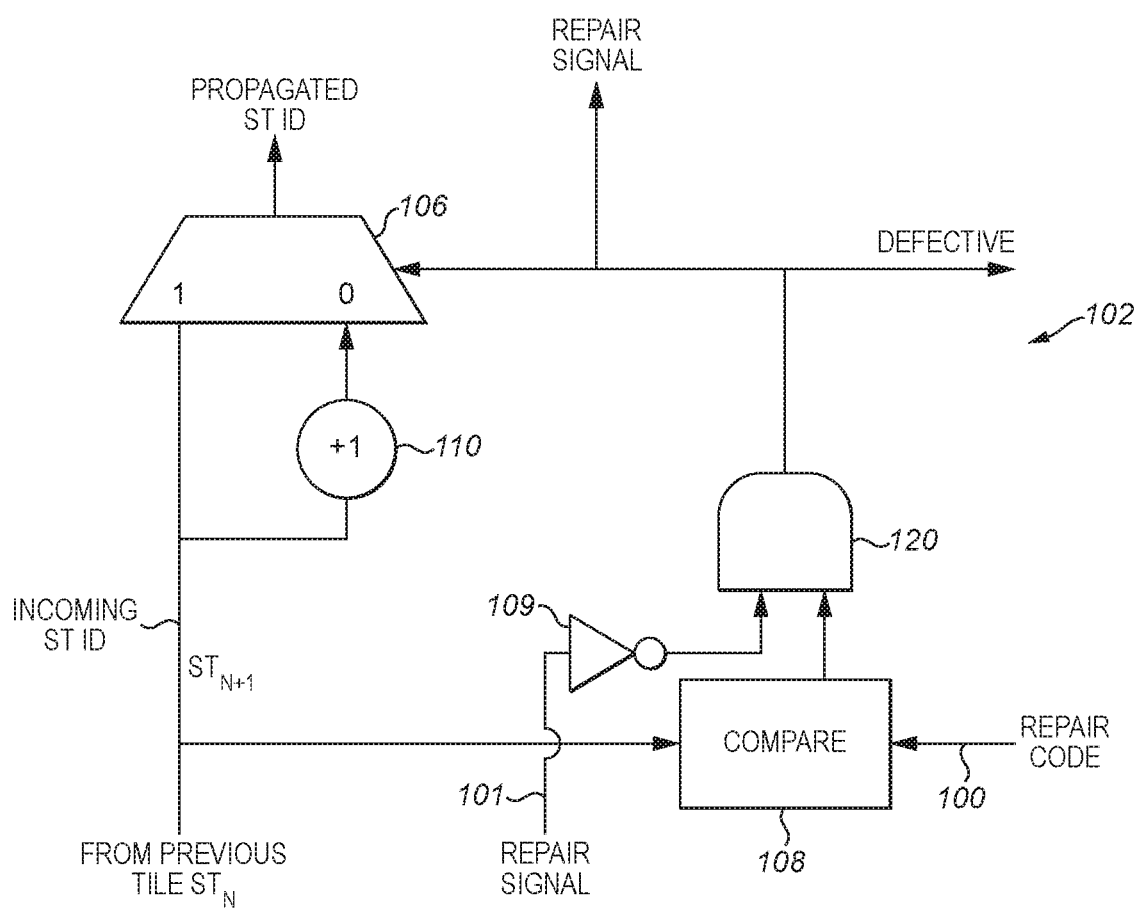
FIG. 10B is a schematic diagram illustrating tile numbering and repair logic.

Reference will now be made to FIGS. 10A and 10B to explain how tile identifiers are incremented in the event of a repair. Before describing the repair mechanism, the mechanism by which supertile identifiers are allocated will firstly be described. FIG. 7 illustrates the fields of the tile identity for each tile. The tile identity is represented by a bit sequence 700. The tile identity comprises a super tile identity, which indicates the supertile to which the tile belongs, a column identity, which indicates the column to which the tile belongs, and a tile sub-identity, which distinguishes between the tiles within the particular supertile. In this example, the supertile identity comprises bits 6 to 10, the column identity comprises bits 2 to 5, and the tile sub-identity comprises bits 0 to 1. Bit 0 is East/West, that is, it indicates whether the tile is on the East or West side of the supertile; Bit 1 is odd/even, that is, it indicates whether or not the tile is the lower or upper, viewed in the direction of the column away from the exchange. In order to allocate supertile identifiers in setting up the chip, each supertile has access to a set of supertile ID wires 104, one for each bit of the supertile ID. In the described embodiment there are five bits, so there are five wires. The supertile at the base of each column has these bits set to 0 by asserting a logic zero on the wires. Logic circuitry 102 on each supertile is connected to these wires to enable each supertile in a column to read a different supertile ID from the wires. Each supertile is numbered in sequence moving up the column by incrementing the last seen supertile identifier by 1. This is achieved by a five bit addition circuit 110 in each supertile which adds 1 to the identifier of the supertile of the next adjacent lower tile, which is propagated up the column over the supertile ID wires 104. In this way, each supertile acquires a supertile identifier which is an ordered number sequence up the column [0-->19]. The logic circuit 102 effects the incrementing and propagating for each supertile. This is now described in more detail, with the repair mechanism which may also be implemented in the circuit 102.

FIG. 10A shows a single column 62a of tiles. Each supertile receives a five bit repair code over a code repair bus 100. The repair code is set up after testing the chip and, in this embodiment, enables one supertile per column to be repaired. The repair code may be stored by efuses on the chip in sixteen sets of efuses, one per column. These efuses may be in the repair engine 69. Although only two lines are shown in FIG. 10A, this represents five wires, a physical wire for each bit of the repair code. While the repair code bus 100 is shown adjacent the column, it can be implemented in any physical manifestation such that the five bits are each received by a respective supertile in the column. Each column of the array has its own repair code bus. The circuit 102 inspects the five bit repair code and causes an incremented or non-incremented supertile identifier to be propagated. That is, depending on the repair code, the supertile identifier which is propagated to the next supertile is incremented or not.

FIG. 10B shows the circuit 102 more detail. A hard wired circuit implementation is used to avoid the need to execute code on each tile in order to number tiles and implement repair. The supertile identifier $ST_{N+1}$ from a previous supertile $ST_N$ is shown incoming to a multiplexer 106. The supertile identifier $ST_{N+1}$ is supplied to a compare block 108 which also receives the repair code from repair bus 100. Note that it is only necessary to supply the supertile identifier to the compare block (and not the whole tile identifier), because in the described embodiments an entire supertile is repaired even in the case of only one defective tile in the supertile. In addition, the logic has a module 120 implementing the functionality of an AND gate which receives the output of the compare block 108 and a repair signal from the previous supertile, via an invertor 109. The repair signal is hardwired low, logic (0), at the base of a column there is no previous supertile. The compare block 108 at an Nth supertile operates to compare the repair code with the incremented 5 bit supertile identifier of the N−1th tile. [So, in FIG. 10B, the $_{N+1th}$ supertile receives the identifier from ST$_N$]. If the repair code does not match the tile identifier the output of the AND module is not asserted, and the multiplexer 106 selects the incremented identifier to propagate. If the repair code matches the supertile identifier and the status of the repair signal is low (no repair has occurred in the preceding supertile), this means that that tile is defective. The AND module receives an asserted output from the compare block and a HIGH signal from the invertor 109. Thus, the output of the AND module 120 asserts a DEFECTIVE status on the repair signal which disables the tile. Disabling a tile causes its multiplexer to be disabled (MUX control and MUX output), and renders its incoming set of exchange wires redundant. Also, the state of the SYNC request wire is set to asserted, to ensure that synchronisation is not held up due to defective tiles. The multiplexer 106 is switched to propagate the unincremented supertile ID. Note that (as discussed in more detail elsewhere in this description) disabling a supertile effectively disables four multiplexers (one associated with each tile in the supertile).

Note that the action take on the tile depends on the state of the repair signal. If the repair signal is low, the output of the compare logic 108 inhibits the propagation of an incremented tile identifier. Thus, the next supertile which has a physical identity in the column (ST$_{N+2}$) takes on the identity of the repaired supertile below it (ST$_{N+1}$).

When the next tile (which is (ST$_{N+2}$ in the column, new renumbered (ST$_{N+1}$) compares the supertile ID with the repair code, there is a match. However, the repair signal (set to DEFECTIVE) is high. The invertor output is low and this means that the AND module 120 does not assert DEFECTIVE status on the repair signal. Thus, the incremented input (ST$_{N+2}$) of the multiplexer 106 is propagated to the next tile in the column (ST$_{N+3}$). At the next supertile, there is no match with the repair code, and so incrementing and propagating can continue up the column.

In this way, each tile is provided with a repaired tile identifier by a mechanism which is rendered completely invisible to a compiler or programmer. That is, there is no need for a compiler to understand that a tile has been renumbered with a different ID or is now in a different relative location. Thus, a mechanism can be used to repair columns of tiles such that, although the repairs might be different in different chips, software which is designed to run on one chip can run on any other chip. Moreover, it can run on a chip whether it has been repaired or not. Thus, the repair mechanism is decoupled completely from software. Although repair of one supertile per column has been described, the technique may be adapted to repair more than one supertile in a column, by modifying the logic circuitry and providing more than one repair code per column. Two separate comparators, inventors, AND gates and repair signals would be utilised. The DEFECTIVE signal would be the logical 'OR' of the two AND gate outputs. The two AND gate output would generate separate outgoing repair signals to the next supertile.

FIG. 6 illustrates the principles of the novel repair mechanism described herein. Many details have been omitted from FIG. 6 for the sake of clarity. FIG. 6 shows two columns 62a, 62b as mentioned. These columns are shown in the "North West array"—it will be appreciated that according to the preceding description there will be four arrays of similar columns. For example, there might eight columns in each array. The input and output lines to one tile denoted 4 of the supertile which is shown numbered 1 in FIG. 6 are shown. It will be appreciated that, as explained above, there are similar connections for every tile in the column. That is, to reiterate, each tile has an input connection 217, and output connection 218 and a MUX control line 214. The wires constituting these connections pass through a shim circuit 65. The shim will be described in more detail later, but in essence, the idea is that it incorporates a pipeline stage which contributes to the overall time that it takes for a data item to traverse the connections. While one pipeline stage is shown, and is a preferred implementation, it will be appreciated that any number of pipeline stages could be incorporated into the shim circuit 65. Each column has a shim circuit 65. The shim circuit provides respective delays for the connections to all tiles in the column. Other configurations are possible—for example there could be pipeline stages introduced into each of the connection lines in any appropriate architectural configuration. However, the manner in which the shim circuits have been implemented, close to the exchange and with the pipeline stages grouped together by column, enables a particularly effective control when implementing the repair mechanism. Also in FIG. 6, reference numeral denotes a set of multiplexers. Each supertile has four multiplexers connected to the respective inputs of each tile in the supertile. The multiplexers for a single supertile are shown in FIG. 8. Each multiplexer has it own multiplexer control line 214, (1, 2, 3, 4)—its output line 217, (1, 2, 3, 4) (which forms the input connection to the tile), and the multiplexer input lines themselves—one input connected to each of the cross wires in a bundle of exchange cross wires 34a in the exchange 34. In FIG. 8, only the first and last input connections to the multiplexer are shown for reasons of clarity. The multiplexers 210, (1, 2, 3, 4) are arranged in a block which receives a repair code as will be discussed later. In FIG. 6, this repair code is shown being supplied by a repair engine 69. Note that in FIG. 6, the line providing the repair code to the multiplexer block 67 is not shown complete for reasons of clarity. In fact, it is connected in such a way as to supply a repair code both to the multiplexer block 67 and to the pipeline stage shim 65.

Figure 9:
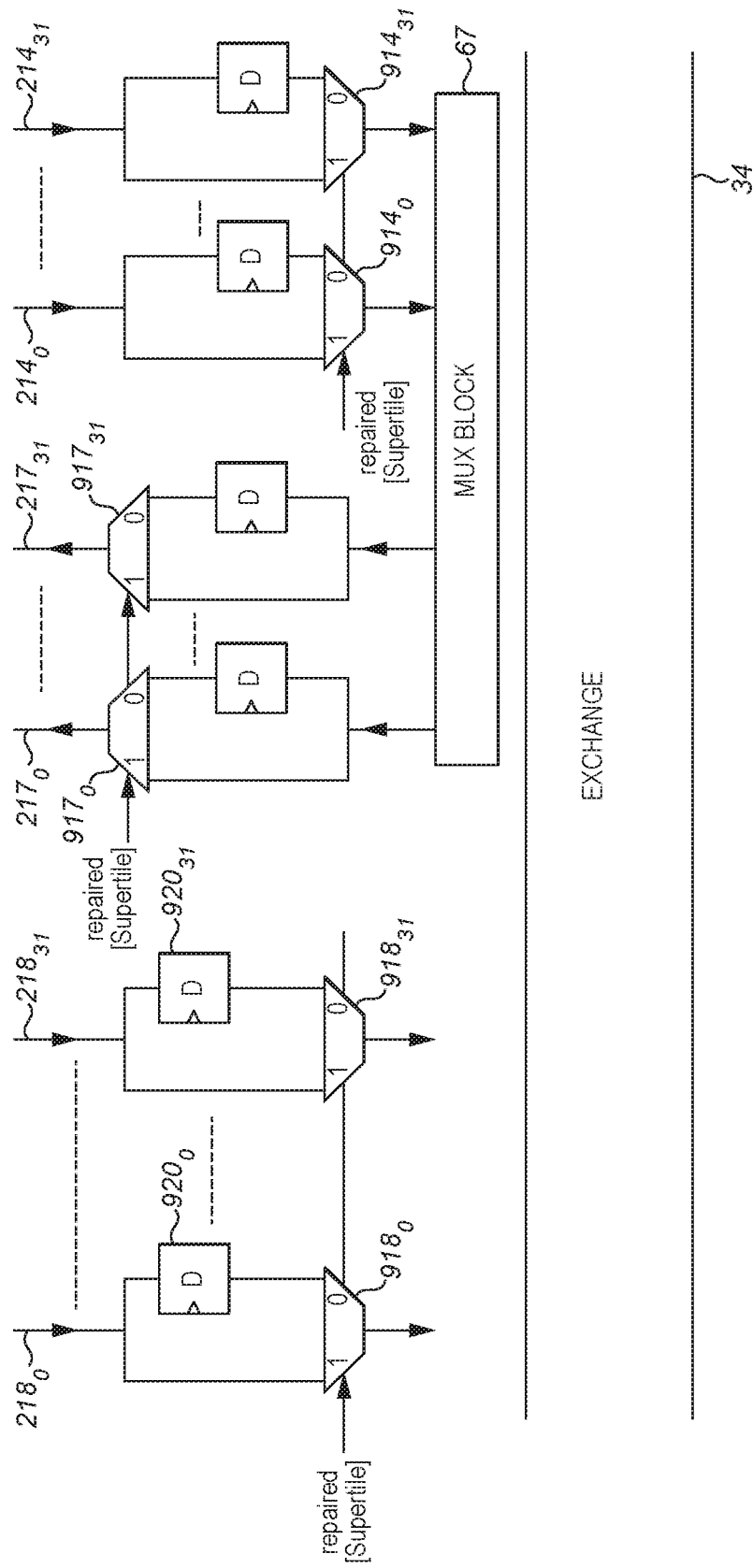
FIG. 9 is a schematic diagram illustrating delay shims for preserving latency in repair.

According to the principles of one aspect of the present invention, if a faulty supertile is detected in a column, and it is determined that it is the only faulty supertile in that column (because the repair technique described herein only repairs one supertile per column), then the repair mechanism is instigated. For example, the supertile numbered ST2 in column 62a could have been detected as faulty. According to the repair mechanism, the supertile which is numbered supertile ST3 in column 62a takes on the tile identity of the supertile number ST2 as far as operations of the chip is concerned. Each tile stores, in its own memory 22, its tile identity in the form of a bit sequence which is shown in FIG. 7. Note that a memory is not necessary—in some embodiments the supertile ID could be read directly off the supertile wires 104, and the column ID read of a column number set of wires. All that would be needed at each individual tile is the two bit tile ID. [Odd/even; East/West]. Furthermore, all tiles above the defective tile similarly get an incremented supertile ID to reflect the supertile ID of the tile below it. This ends up with the supertile ID for the supertile number ST19 being taken from the supertile ID for supertile number ST18 just below it. As a result of this supertile numbering, when code is compiled for the processor, the defective supertile (formerly supertile number 2) has now effectively become invisible. Any code intended for tiles forming supertile number ST2 will be automatically loaded into corresponding tiles of what was formerly physically numbered supertile number ST3 and is now being logically renumbered as supertile number ST2. That is, the repairing supertile has taken on the identity of the repaired supertile. Note that it is not necessary, however, for the compiled code to adjust any headers in order to make sure that message exchange is properly accomplished. According to the time deterministic exchange mechanism, what is needed is to adjust the timing of the message exchange so that messages that would have been timed to have been received by supertile number ST2 are instead timed in accordance with the physical location and latencies of supertile physically numbered ST3. To achieve this, the shim circuit 65 introduces a pipeline stage into the latency on every line for non-repaired tiles. However, for repaired tiles, this pipeline stage can be by-passed such that the latency which would have been perceived at a physical location of the repaired supertile, is now instead perceived at the physical location of the repairing supertile, which is located one pipeline stage above. The circuitry within the shim circuit 65 for doing this is shown in FIG. 9. FIG. 9 shows a set of multiplexers $918_0$, $918_{31}$ which represent thirty two multiplexers each receiving one wire from the thirty two bit output connection 218. Note that the shim circuit is not shown in the earlier figures for reasons of clarity. Each multiplexer 918 has one input which is received via a pipeline stage 920 which could for example be a D-type flip flop or any temporary store in accordance with the pipeline stages which are used to construct the on-chip message exchange bus and the exchange itself. A repaired supertile indicator controls which input of the multiplexer 918 is supplied to the exchange 34. If a supertile has not been repaired, the input via the pipeline stage 920 is selected. If a supertile has been repaired, that is, it is to function as the repairing supertile in place of a defective supertile, the input which by-passes the pipeline stage is selected. In this way, the latency on the data output line of a repairing supertile matches that of the supertile whose identity it has replaced. Thus, any messages transmitted from a tile on the repairing supertile will appear, from a timing perspective, to come from the corresponding tile on the supertile that it has replaced. This is consistent because the supertile identity has also been altered to reflect that of the repaired supertile. A similar mechanism exists on the input line, as shown by multiplexers $917_0 \ldots 917_{31}$. Further, a similar mechanism exists for the MUX control signal themselves, which also have to have their timing adapted so that the timing of the MUX control for the repairing tile is respected. The same mechanism is used as shown by multiplexers 9140 to $914_{31}$. Note that these multiplexers are in addition, and not in place of the switching multiplexers in the MUX block 67. Note in particular, that the outputs of the multiplexers 914 will act as a switch control for a switching multiplexer 210 of that tile. The exchange signals for all four tiles in a particular supertile are subject to the same by-pass signal "repaired [supertile]". There is a "repaired [supertile]" signal for each column. Note that in some cases this signal equals 0 (indicating that there is no repair for that column). The "supertile" is the tile identity of the repaired super tile. This by-pass multiplexer control signal "repaired [supertile]" depends only on the repair code for the column in question. Repair codes may be thought of as pseudo static— they are set once for each chip and then remain static for that chip while it is in use. The physical supertile number ID of the tiles denotes which signals on the exchange fabric are hard wired to it. Thus, for all twenty supertiles in a column [numbered ST0 to ST19], the twenty different by-pass multiplexer control signals are simply a thermometer decoding of a 5-bit repair code [4:0], to determine whether the "repaired [supertile]" signal should be high or low based on whether or not the supertile number is greater than the supertile number of the repaired supertile. That is:

repair [4:0];
repaired [supertile]=supertile>repair [4:0])?1;0.

In circumstances where there is no tile to be repaired in a column, by default the repair code equals 19, thereby disabling supertile ST19 and enabling no-bypass multiplexers in the shim circuit.

Note that the SYNC ACK signals mentioned earlier to all supertiles must also undergo a similar delay compensation for supertile repairability. This can be applied in a block associated with each supertile, rather than in the shim circuit 75 for each column, although any appropriate implementation may be used.

Figure 11:
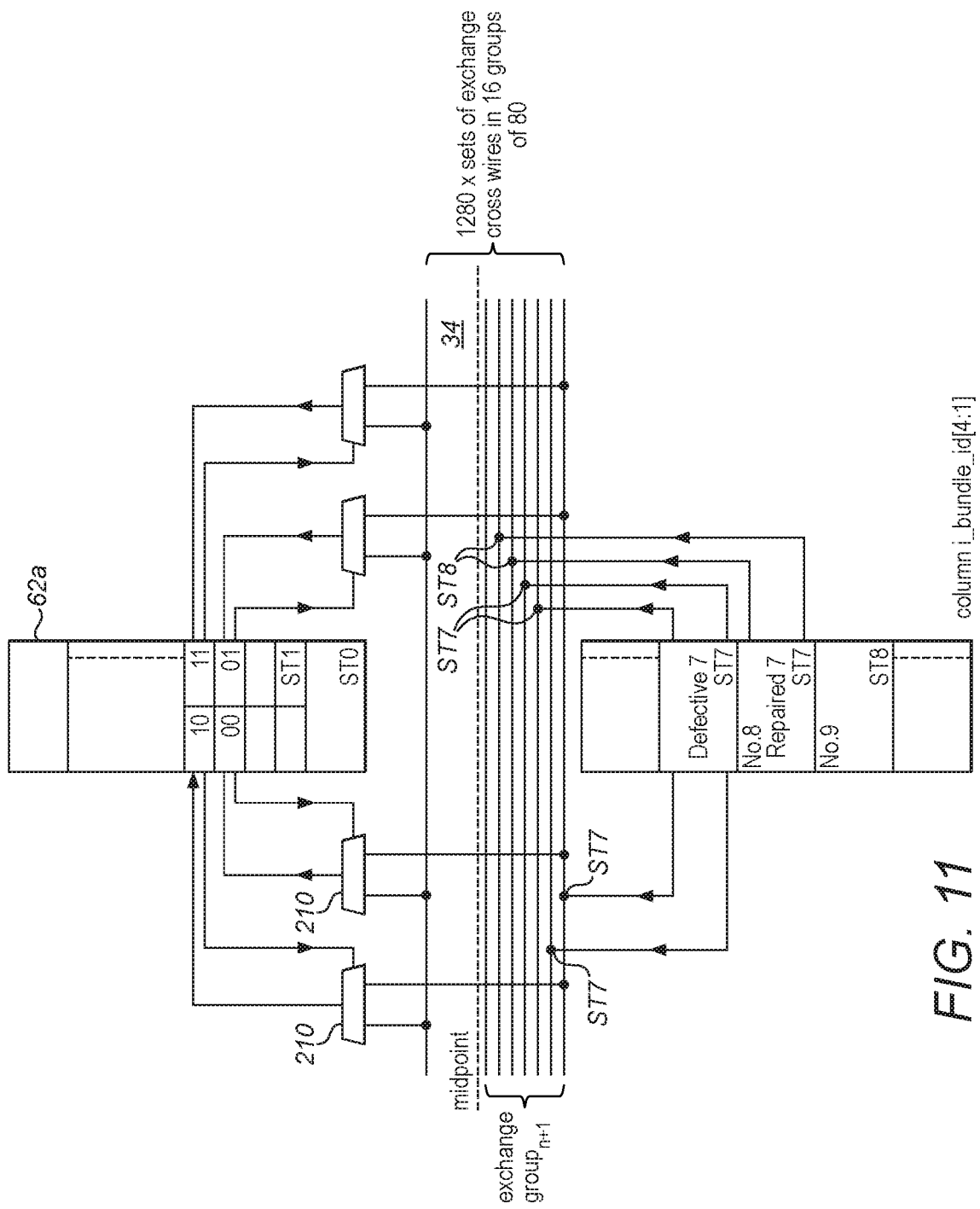
FIG. 11 is a schematic diagram illustrating columns on opposed side of an exchange to illustrate tile and multiplexor repair.
Figure 12:
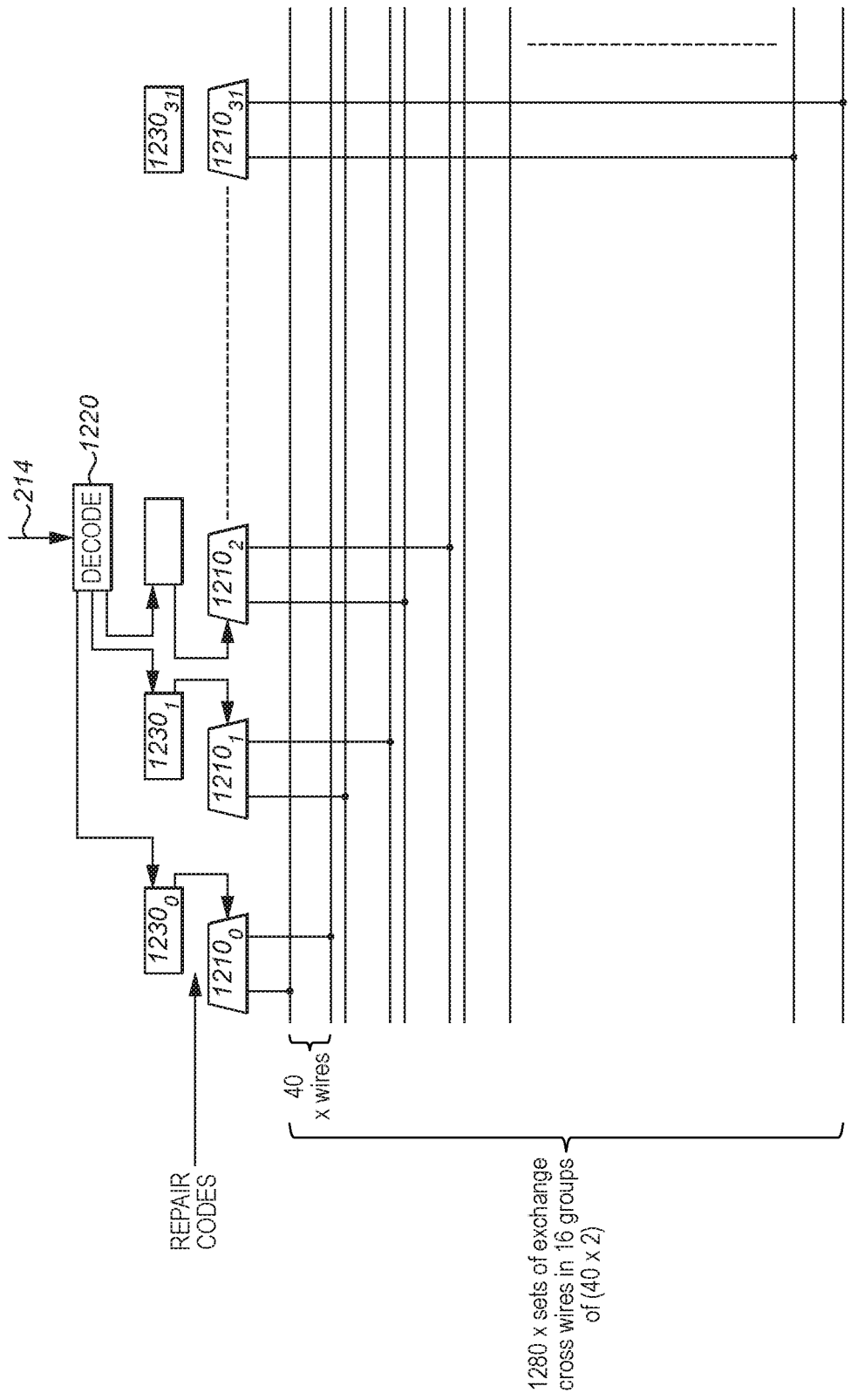
FIG. 12 is a schematic diagram illustrating repair in a multiplexor.

Reference will now be made to FIGS. 11 and 12 to explain how the repair code modifies the decoder in the multiplexer block 210 to take into account repaired tiles in a column. Before discussing the repair, the normal mechanism of the multiplexers will first be outlined. A multiplexer 210 receives a multiplex control signal on the control line 214 which identifies a unique tile identifier indicating where that multiplexer should 'point'. That is, to which set of cross wires on the exchange 34 should that multiplexer connect in order to 'listen to' the tile from which a transmission is expected at that time. As explained herein, the tile identifier is in the form of a 5 bit supertile ID, a 4 bit column ID and a 2 bit tile ID.

In the arrangement described herein, the multiplexer for the tiles in each column is connected to a bundle of 40 sets of the exchange cross wires. Each set permits a 32 bit datum to be conveyed over the exchange. As further shown in FIG. 11, the sets are divided into two, which are referred to as East and West (depending on which side of the column the multiplexers would be connected to). FIG. 11 shows two multiplexers connected to supertile ST2 on the East side of the column, and two multiplexers connected to supertile ST3 on the East side of the column. On the West side of the column two multiplexers are shown connected to two tiles in supertile ST2. For the sake of clarity, no other multiplexers or their connection lines are shown in FIG. 11, but it will be appreciated that there are two multiplexers for each super tile on each side of the column, making a total of twenty multiplexors on the east side and twenty multiplexors on the west side. Each multiplexor should be capable of connecting to any of the 1280 sets of exchange cross wires in the exchange fabric 34. In some chips, only 1216 exchange cross wires are required, but in others (for example in chips when no repair is required), all 1280 sets may be active. In order to implement a 1216 way multiplexer, in such a manner that repair can be implemented efficiently, each multiplexer 210 comprises 32 40 way multiplexer slices which are illustrated in FIG. 12. The multiplexer slices are labelled 1210-0, 1210-1 . . . 1210-31. The number of 32 has been chosen to match the number of columns in the array connected to each exchange. Note that this number may be varied as the number of columns is varied in any particular processor architecture. However, in preferred embodiments there is one n way multiplexer slice per half column. The multiplexer 210 comprises a decode block 1220 which receives the MUX control signal on line 214. In addition, each multiplexer slice 1210 is associated with respective repair logic 1230. Before describing the repair logic, the normal operation of the multiplexer decode will be described. As mentioned, the decode block receives the unique tile identifier of the transmitting tile on MUX control line 214. The decode block 1220 selects one of the 32 multiplexor slices based on the column identifier bit in the tile identifier. Then, the least significant bit of the tile identifier indicates whether an Eastern set of inputs or a Western set of inputs of that multiplexer slice is to be selected (depending on whether the transmitting tile is on the East or West side of the transmitting column). Then, the supertile identifying bits of the tile identifier are used to select one of 20 inputs in the East or Western slice of the multiplexer 1210. In that way, a particular input is selected at the time at which a message from the transmitting tile is expected to be received at the receiving tile in a time deterministic fashion as described earlier.

Use of the repair logic 1230 in the context of the repaired tiles will now be described. FIG. 11 shows a column labelled 62c which is shown on the South side of the exchange fabric 34 but which could be anywhere in the array. As described, the column will have 20 supertiles, but only three are shown for the sake of the present explanation. The tiles which are shown are supertiles numbered ST7, ST8 and ST9. Supertile number ST7 has the tile outputs of the tiles on its Eastern side connected to the exchange fabric on sets of wires labelled ST7. As has already been explained, there will be a corresponding pair of exit wires from the tiles on the Western side of supertile number ST7 which will be connected to different sets of wires in the exchange fabric. These are not shown for reason of clarity. Supertile number ST8 similarly has exit wires from its two tiles on the Eastern side of the column connected to the cross wire of the exchange fabric as labelled at S3T. The exit wires shown from the two tiles on the Western side of supertile number 8 are also shown. In this scenario, consider that supertile on the ST7 has been found to be defective, and supertile number ST8 has taken on its identity. This means that when a multiplexer is controlled to receive a data that would have been expected from ST7, this datum will now appear on the exchange fabric cross wires at supertile ST8. The multiplexers needs to take this into account in order to point to the correct wires in the exchange fabric. This is achieved using the repair logic 1230 in the multiplexers 210. Each repair logic 1230 receives a repair code which is associated with a respective column. That repair code control has the effect of the decoder on that multiplexer in the following way. The repair logic 1230 receives the repair code and compares it with the supertile identifier of the incoming MUX control signal. If the repair code is less than the supertile identifier is not repaired, then there is no effect on the decode logic, and the selected supertile matches that with the MUX control signal. However, if the MUX control signal is the same as or greater than the supertile indicated in the repair code, then the multiplexer selects wires according to the super tile ID in the MUX control signal incremented by one. That is, the 9th tile in the column bus is selected instead of the 8th, the 10th instead of the 9th, all the way up to the 20th being selected instead of the 19th. Recall that in each case the 9th tile is number 8, the 8th tile is number 7 etc. (because the first tile is numbered zero).

It was mentioned earlier how two supertiles per column could be repaired with two repair codes. The mux decode adjustment described above could be modified similarly to accommodate up to two repaired supertiles per column in the following way. If both repair codes are greater than the supertile identifier then there is no effect on the decode logic. If the MUX control signal is the same as or greater than one of the repair codes, then the multiplexor selects wires according to the supertile ID in the MUX control signal incremented by one. If the MUX control signal is the same as or greater than both of the repair codes, then the multiplexor selects wires according to the supertile ID in the MUX control signal incremented by two. For this method to work correctly, it is important that the two repair codes are not allowed to indicate the same supertile.

A particular example is laid out below, in the case of one repair code, repairing one supertile.

Assume the input i_select[10:0] is the tileID from register $INCOMING_MUX in the receiving tile (to which this particular 1344-way exchange bus 'belongs').

Referring to FIG. 7, bit [0] (determining odd/even tile) and bits 5:2 (determining which column) serve merely to identify whether the mux selection is within a particular group of 42 busses.

Bit [1] determines which of a group of 2 busses (from tiles in the same supertile) is selected. For example the bus on the East or West side.

Most interestingly though; i_select[10:6] determines which supertiles' buses are selected.

Input i_repair[4:0] is the repair code for the particular column denoted by i_bundle_id[4:1] (the column whose tiles' exchange busses are selected by this particular 42:1 mux instance)

The effect of the i_repair[4:0] on the mux decoder has been outlined above—but here is a specific example:

Let's assume that i_repair[4:0]=7; indicating that the eighth supertile in column is defective (NB: the supertiles are numbered from 0 so the eighth supertile is number 7).

If i_select[10:6]==0 to 6, then repaired_supertile[4:0]==i_select[10:6]

However, if i_select[10:6] ==7 to 18, then repaired_supertile[4:0]==i_select[10:6] +1 (the $9^{th}$(#8) tile in the column's bus is selected instead of the $8^{th}$ (#7), the $10^{th}$ instead of the $9^{th}$ . . . and so on . . . up to the $20^{th}$ (#19) being selected instead of the $19^{th}$(#18)).

In this particular column; the delay compensation pipeline stages discussed earlier will need to be disabled (bypassed) for all (4) tiles in supertiles #8 to #19 because they take the identity of supertiles #7 to #18 respectively but are all 1 cycle further away from the exchange. Supertile #7 does not matter in this regard since it is labelled defective and busses from tiles within it will not be selected.

While particular embodiments have been described, other applications and variants of the disclosed techniques may become apparent to a person skilled in the art once given the disclosure herein.

What is claimed is:

1. A processor comprising a plurality of processing circuits, wherein there is a fixed transmission time for transmitting a message from a sending processing circuit to a receiving processing circuit, based on the physical positions of the sending and receiving processing circuits in the processor, wherein the plurality of processing circuits are arranged in a column, wherein the fixed transmission time depends on the position of a processing circuit, in the column, wherein each processing circuit of the plurality of processing circuits comprises at least one communication path involved in a message exchange, and wherein the processor comprises at least one delay stage for each processing circuit and switching circuitry for selectively switching the delay stage into or out of the communication path, further wherein for processing circuits on a first side of a defective processing circuit in the column, the delay stage is switched into the communication path, and for processing circuits on a second side of the defective processing circuit in the column, the delay stage is switched out of the communication path.

2. A processor according to claim 1 wherein each processing circuit has a physical identity based on its position in the column, and a logical identity fir the purposes of accepting code to be executed by the processing circuit, wherein the physical identity and the logical identity are the same for all processing circuits on the first side, but wherein in the case of a repair each processing circuit on the second side takes on a logical identity to match the physical identity of the processing circuit which it replaces.

3. A processor according to claim 2 wherein a repairing processing circuit takes on the logical identity of the processing circuit adjacent to it in the column.

4. A processor according to claim 3 wherein each processing circuit above the repairing processing circuit takes on a logical identity representing the physical identity of the processing circuit below in the column.

5. A processor according to claim 1 wherein the latency of the delay stage matches the latency of the communication path to traverse a processing circuit.

6. A processor according to claim 1 wherein the communication path comprises a data output wire which transmits data from a processing circuit to an exchange fabric, the exchange fabric configured to exchange messages between sending and receiving processing circuits, the column being arranged with respect to the exchange fabric such that the fixed transmission time depends on the distances of the processing circuits with respect to the exchange fabric.

7. A processor according to claim 1 wherein the communication path comprises a switching control wire which controls a switching circuit to accept input data from an exchange fabric, the exchange fabric configured to exchange messages between sending and receiving processing circuits.

8. A processor according to claim 7, wherein the communication path comprises a data input wire which is connected to the output of the switching circuit to supply data to the processing circuit.

9. A processor according to claim 1 wherein the communication path comprises a wire for receiving a synchronisation acknowledgement signal from synchronisation logic on the processor, wherein the synchronisation logic on the processor is operable to generate a synchronisation acknowledgement signal to each processing circuit when it has received a request for synchronisation from each of the processing circuits.

10. A processor according to claim 1 comprising a plurality of columns, each column having the same number of processing circuits and wherein a processing circuit in an nth position in each column has the same latency with respect to an exchange fabric as a processing circuit in an nth position of each other column.

11. A processor according to claim 10 wherein the communication path comprises a data output wire which transmits data from a processing circuit to the exchange fabric, and wherein the exchange fabric comprises multiple groups of pipelined exchange paths, wherein the processing circuits in each column have data output connection wires connected to exchange paths in a respective group associated with that column.

12. A processor according to claim 11 comprising associating with each column a group of switching circuits, each switching circuit having multiple inputs connected to exchange paths in each of the groups of the exchange fabric, the exchange fabric configured to exchange messages between sending and receiving processing circuits.

13. A processor according to claim 12 wherein the switching circuits are associated with decode logic configured to receive a switching control signal on a control input, the control signal comprising a column identifier and a sub-identifier and to select one of the switching circuits based on the column identifier and one of the inputs based on the sub-identifier.

14. A processor according to claim 1 comprising recording circuitry configured to record a repair code for any column which has a defective processing circuit.

15. A processor according to claim 13, comprising recording circuitry for recording a repaircode for any column that has a defective processing circuit, and wherein the switching circuit is associated with repair logic which is operable to compare the sub-identifier with the repair code, and if the sub-identifier is less than the repair code, select one of the inputs, but if the repair code equals or is greater than the sub-identifier to increment the sub-identifier and select he one of the inputs corresponding to the incremented sub-identifier.

16. A processor according to claim 1 wherein the processing circuit comprises multiple processing tiles, each associated with a respective switching circuit.

17. A processor according to claim 14 wherein the switching circuits associated with each delay stage in a column are controllable by the repair code for that column.

18. A processor comprising a plurality of processing circuits, wherein the plurality of processing circuits is arranged in an array, the processor comprising:
  a first set of the processing circuits arranged on a first side of a defective processing circuit in the array;
  a second set of the processing circuits arranged on a second side of the defective processing circuit;
  a plurality of delay stages associated with the plurality of the processing circuits; and
  switching circuitry configured to switch individual ones of the delay stages into and out of communication paths of the plurality of processing circuits, wherein the switching circuitry is further configured to switch a first set of the delay stages into communication paths associated with the first set of processing circuits and to switch a second set of the delay stages out of communication paths associated with the second set of processing circuits.

19. The processor of claim 18, wherein there is a fixed transmission time for transmitting a message from a first one of the processing circuits to a second one of the processing circuits, the fixed transmission time based on physical positions of the first one of the processing circuits and the second one of the processing circuits.

20. The processor according to claim 18 wherein each processing circuit has a physical identity based on its position in the array, and a logical identity for the purposes of accepting code to be executed by the processing circuit, wherein the physical identity and the logical identity are the same for all processing circuits in the first set, but wherein in the case of a repair each processing circuit in the second set takes on a logical identity to match the physical identity of the processing circuit which it replaces.

21. The processor according to claim 20 wherein a first one of the processing circuits in the second set takes on the logical identity of an adjacent processing circuit.

22. The processor according to claim 21 wherein the first one of the processing circuits in the second set takes on the logical identity representing the physical identity of the adjacent processing circuit that is closest to the defective processing circuit.

23. The processor according to claim 18 wherein a latency of a given delay stage matches a latency of a given communication path to traverse a corresponding one of the processing circuits.

24. The processor according to claim 18 wherein a first one of the communication paths comprises a data output wire which transmits data from a first one of the processing circuits to an exchange fabric, the exchange fabric configured to exchange messages between the first one of the processing circuits and the second one of the processing circuits, the array being arranged with respect to the exchange fabric such that a fixed transmission time depends on a distance of a given one of the processing circuits withrespect to the exchange fabric.

25. The processor according to claim 18 wherein a first one of the communication paths comprises a switching control wire which controls the switching circuitry to accept input data from an exchange fabric, the exchange fabric configured to exchange messages between sending and receiving ones of the processing circuits.

26. The processor according to claim 25, wherein the first one of the communication paths comprises a data input wire which is connected to an output of the switching circuitry to supply data to a first one of the processing circuits.

27. The processor according to claim 18 wherein a first one of the communication paths comprises a wire for receiving a synchronisation acknowledgement signal from synchronisation logic on the processor, wherein the synchronisation logic is configured to generate a synchronisation acknowledgement signal to each of the processing circuit after it has received a request for synchronisation from each of the processing circuits.

28. The processor according to claim 18 further comprising a plurality of arrays, each array having a same number of processing circuits and wherein a processing circuit in an nth position in each array has a same latency with respect to an exchange fabric as a processing circuit in an nth position of each other array.

29. The processor according to claim 28 wherein a first one of the communication paths comprises a data output wire which transmits data from a first one of the processing circuits to the exchange fabric, and wherein the exchange fabric comprises multiple groups of pipelined exchange paths, wherein ones of the processing circuits in each array have data output connection wires connected to exchange paths in a respective group associated with a respective array.

30. The processor according to claim 29 comprising associating with each array a group of switching circuits, each switching circuit having multiple inputs connected to exchange paths in the exchange fabric, the exchange fabric configured to exchange messages between sending and receiving ones of the processing circuits.

31. The processor according to claim 30 wherein the switching circuits are associated with decode logic configured to receive a switching control signal on a control input, the switching control signal comprising an array identifier and a sub-identifier and to select one of the switching circuits based on the array identifier and one of the inputs based on the sub-identifier.

32. The processor according to claim 31, comprising recording circuitry configured to record a repair code for any one of the arrays that has a defective processing circuit, and wherein the switching circuits are associated with repair logic which is operable to compare the sub-identifier with the repair code, and if the sub-identifier is less than the repair code, select one of the inputs, but if the repair code equals or is greater than the sub-identifier to increment the sub-identifier and select one of the inputs corresponding to the incremented sub-identifier.

33. The processor according to claim 18 comprising recording circuitry configured. to record a repaircode for the array.

34. The processor according to claim 18 wherein a first one of the processing circuits comprises multiple processing tiles, each associated with a respective switching circuit of the switching circuitry.

35. The processor according to claim 34 wherein the switching circuits associated with each delay stage are controllable by a repair code for the array.

* * * * *